(12) United States Patent
Yoshihama

(10) Patent No.: US 12,182,699 B2
(45) Date of Patent: Dec. 31, 2024

(54) TRAINING DEVICE AND TRAINING METHOD THAT PERFORM INFERENCE PROCESSING USING A FUSION DNN MODEL

(71) Applicant: Panasonic Intellectual Property Management Co., Ltd., Osaka (JP)

(72) Inventor: Yutaka Yoshihama, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 864 days.

(21) Appl. No.: 17/314,832

(22) Filed: May 7, 2021

(65) Prior Publication Data

US 2021/0397954 A1  Dec. 23, 2021

(30) Foreign Application Priority Data

Jun. 22, 2020 (JP) ................ 2020-106847

(51) Int. Cl.
*G06N 3/08* (2023.01)
*G06N 3/045* (2023.01)
*G06N 3/063* (2023.01)

(52) U.S. Cl.
CPC .............. *G06N 3/08* (2013.01); *G06N 3/045* (2023.01); *G06N 3/063* (2013.01)

(58) Field of Classification Search
CPC ........... G06N 3/08; G06N 3/045; G06N 3/063
See application file for complete search history.

(56) References Cited

U.S. PATENT DOCUMENTS

2020/0160843 A1* 5/2020 Shillingford ............ G10L 15/24

FOREIGN PATENT DOCUMENTS

| JP | 2018-055470 | 4/2018 |
|---|---|---|
| JP | 2019-200671 | 11/2019 |
| WO | 2018/168369 | 9/2018 |
| WO | 2018/180134 | 10/2018 |

OTHER PUBLICATIONS

Office Action from Japan Patent Office (JPO) in Japanese Patent Appl. No. 2020-106847, dated Jan. 9, 2024, together with an English language translation.

* cited by examiner

*Primary Examiner* — Pei Yong Weng
(74) *Attorney, Agent, or Firm* — Greenblum & Bernstein, P.L.C.

(57) ABSTRACT

A training device or the like according to the present disclosure trains a fusion deep neural network (DNN) model by (i) using training data that includes two or more modal information items and ground truth labels of the two or more modal information items and (ii) performing knowledge distillation that is a technique in which knowledge obtained as a result of a teacher model being trained is used to train a student model. The fusion DNN model includes: two or more DNNs; and a fusion that includes a configuration in which portions of the two or more DNNs are fused and that receives an input of features that are outputs of the two or more DNNs.

17 Claims, 23 Drawing Sheets

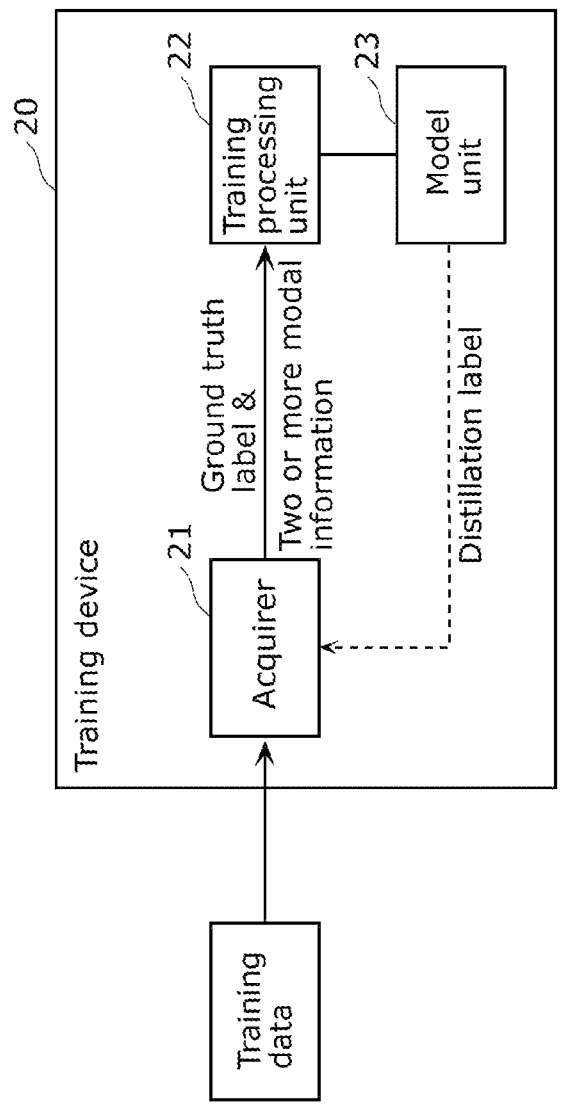

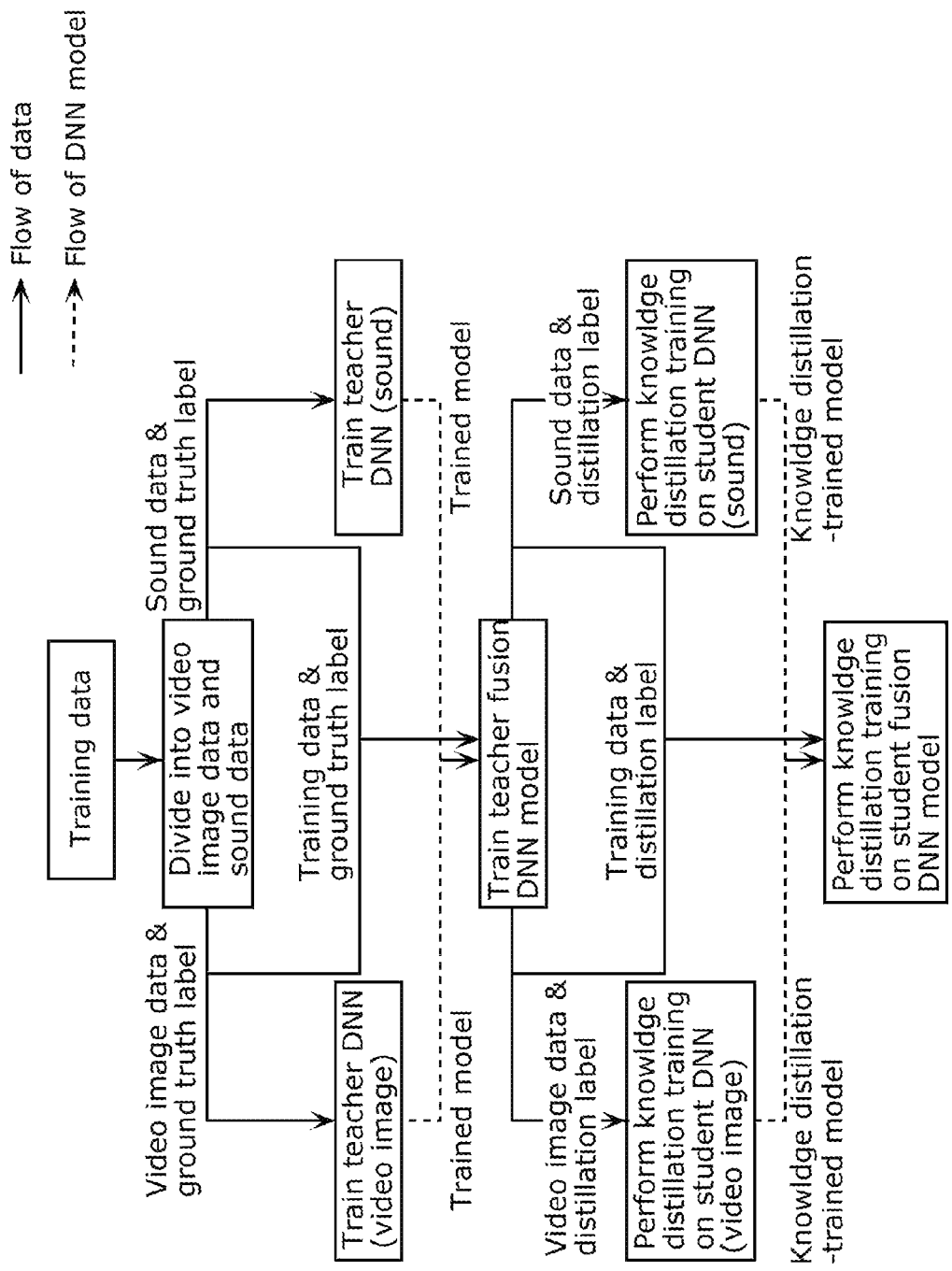

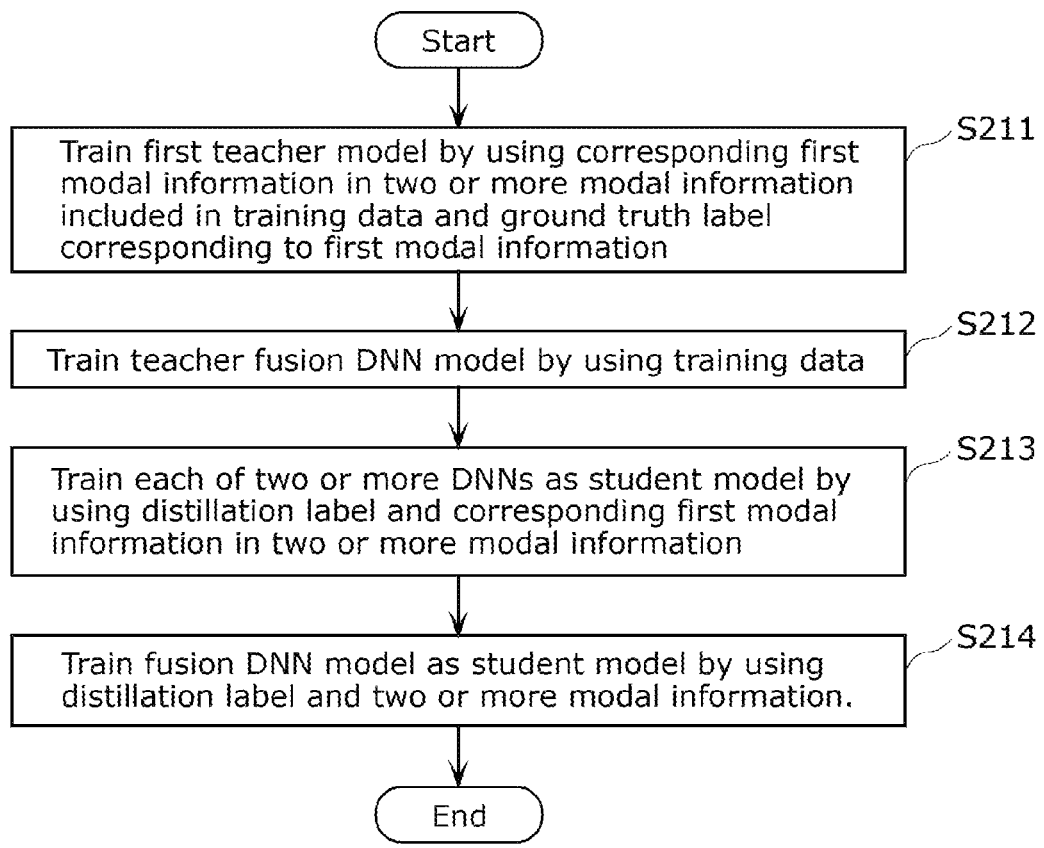

TRAINING DEVICE AND TRAINING METHOD THAT PERFORM INFERENCE PROCESSING USING A FUSION DNN MODEL

CROSS REFERENCE TO RELATED APPLICATIONS

The present application is based on and claims priority of Japanese Patent Application No. 2020-106847 filed on Jun. 22, 2020.

FIELD

The present disclosure relates to a training device and a training method.

BACKGROUND

A facial expression recognition method for identifying a facial expression of a face included in a captured image by using a neural network, and the like are disclosed (see Patent Literature (PTL) 1). According to the technique disclosed in PTL 1, the precision of facial expression recognition is improved by using facial irregularities information, facial texture information, and facial contour information extracted from sample images.

CITATION LIST

Patent Literature

PTL 1: Japanese Unexamined Patent Application Publication No. 2018-55470

SUMMARY

However, the facial expression recognition method and the like according to PTL 1 can be improved upon.

In view of this, the present disclosure provides a training device and the like capable of improving upon the above related art.

A training device according to one aspect of the present disclosure includes: a processor; and a memory, wherein, by using a program recorded in the memory, the processor trains a deep neural network (DNN) model by (i) using training data that includes two or more modal information items and ground truth labels of the two or more modal information items and (ii) performing knowledge distillation that is a technique in which knowledge obtained as a result of a teacher model being trained is used to train a student model, and the DNN model includes: two or more DNNs; and a fusion that includes a configuration in which portions of the two or more DNNs are fused and that receives an input of features that are outputs of the two or more DNNs.

A general and specific aspect disclosed herein may be implemented by using a device, a method, a system, an integrated circuit, a computer program, or a computer-readable recording medium such as a CD-ROM, or may be implemented by any combination of a device, a method, a system, an integrated circuit, a computer program, and a recording medium.

With the training device and the like of the present disclosure, it is possible to further improve the precision of inference results using the neural network.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 4 is a block diagram showing an example of a configuration of a training device according to an embodiment.

FIG. 9 is a diagram showing the processing of the training method shown in FIG. 8, expressed using a flow of data and a flow of DNN model.

FIG. 10 is a flowchart illustrating the processing of the training method according to Example 1 in which two or more modal information items are used.

DESCRIPTION OF EMBODIMENTS

Figure 1:
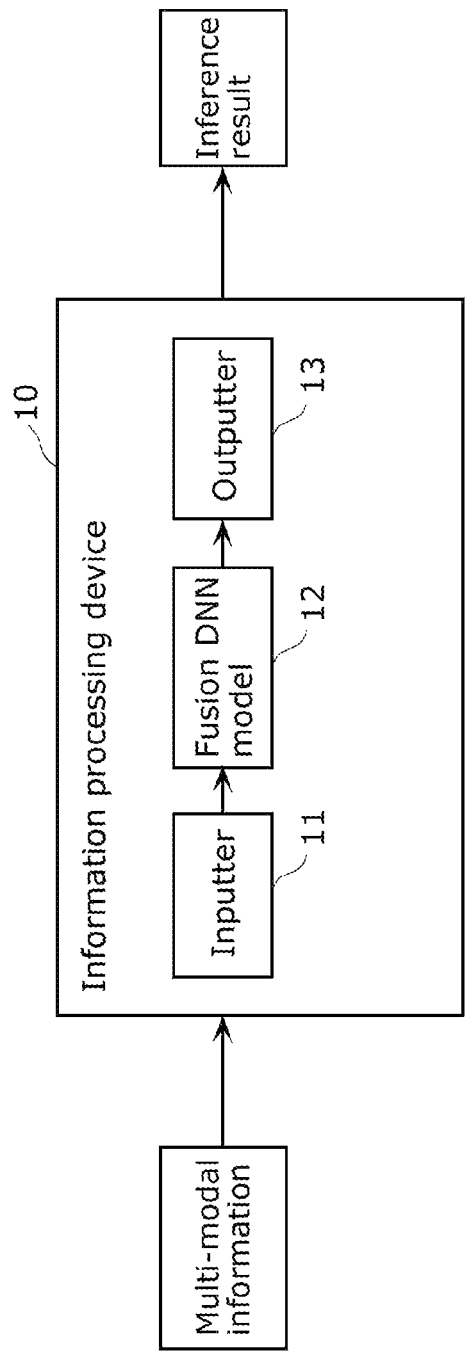
FIG. 1 is a block diagram showing an example of a configuration of an information processing device according to an embodiment.

A training device according to one aspect of the present disclosure includes: a processor; and a memory, wherein, by using a program recorded in the memory, the processor trains a deep neural network (DNN) model by (i) using training data that includes two or more modal information items and ground truth labels of the two or more modal information items and (ii) performing knowledge distillation that is a technique in which knowledge obtained as a result of a teacher model being trained is used to train a student model, and the DNN model includes: two or more DNNs; and a fusion that includes a configuration in which portions of the two or more DNNs are fused and that receives an input of features that are outputs of the two or more DNNs.

With this configuration, it may be possible to train the neural network by performing knowledge distillation in addition to using, instead of a single modal information item, training data including two or more modal information items and ground truth data of the two or more modal information items. With this configuration, it may be possible to further improve the precision of inference results using the neural network.

Also, for example, in the training of the DNN model, the processor may train the DNN model by using the training data and also performing the knowledge distillation on an intermediate layer included in the DNN model; and in the knowledge distillation, the processor may perform the knowledge distillation by training outputs of intermediate layers included in the two or more DNNs by using an output of an intermediate layer included the fusion as a distillation label when the two or more modal information items included in the training data are input to the DNN model.

With this configuration, it is possible to further improve the precision of inference results using the neural network. Furthermore, normal training and knowledge distillation training can be performed simultaneously on a single DNN model (fusion DNN model), and it is therefore unnecessary to perform pre-training for each single modal information item, which was conventionally required to perform knowledge distillation, as a result of which, it may be possible to reduce the number of steps required to perform learning.

Here, for example, in the knowledge distillation, the processor may perform the knowledge distillation by training outputs of a softmax function with temperature obtained as the outputs of the intermediate layers included in the two or more DNNs by using, as the distillation label, the output of the softmax function with temperature obtained as the output of the intermediate layer included in the fusion.

Also, for example, the teacher model and the student model may be DNN models that are same as the DNN model, and in the training of the DNN model, the processor may train one of the DNN model as the teacher model by using the training data, and perform the knowledge distillation by training the other DNN model as the student model by using the output of the DNN model that was trained as the teacher model when the two or more modal information items included in the training data were input as a distillation label that serves as (i) a ground truth of the output of the DNN model to be trained as the student model when the two or more modal information items are input and (ii) a ground truth of outputs of intermediate layers included in the two or more DNNs in the DNN model to be trained as the student model.

With this configuration, it may be possible to further improve the precision of inference results using the neural network. Furthermore, training and knowledge distillation are performed on the student model and the teacher model that are the same DNN models (fusion DNN models), and it is therefore unnecessary to perform pre-training for each single modal information item, which was conventionally required to perform knowledge distillation, as a result of which, it may be possible to reduce the number of steps required to perform learning.

Also, for example, in the training of the DNN model, the processor may train each of first teacher models that are models having a same configuration as the two or more DNNs included in the DNN model by using corresponding first modal information in the two or more modal information items included in the training data and a ground truth label of the corresponding first modal information, the processor may train, by using the training data, a teacher DNN model that includes a teacher fusion and the first teacher models that have been trained, the teacher fusion being a model that has a same configuration as the DNN model, includes a configuration in which portions of the first teacher models that have been trained are fused, and receives an input of features that are outputs of the first teacher models that have been trained, the processor may train each of the two or more DNNs as the student model by using a distillation label that is output as a ground truth when the two or more modal information items are input to the teacher DNN model that has been trained and the corresponding first modal information, and the processor may perform the knowledge distillation by training the DNN model as the student model by using the distillation label and the two or more modal information items.

With this configuration, it may be possible to train the neural network by performing knowledge distillation in addition to using, instead of a single modal information item, training data including two or more modal information items and ground truth data of the two or more modal information items. Accordingly, it may be possible to further improve the precision of inference results using the neural network.

Also, for example, final layers included in the two or more DNNs may be first fully connected layers that output the features that are outputs of the two or more DNNs, and the fusion may include a layer in which the final layers included in the two or more DNNs are connected and to which the features that are outputs of the two or more DNNs are input.

Also, for example, the output of the DNN model may be an inference result for the two or more modal information items, obtained as the output of the fusion.

Also, for example, the two or more modal information items may include sound information and video image information of a moving image in which a target person is shown, and the DNN model may output an emotion of the target person as the inference result.

With this configuration, it may be possible to determine the emotion of the target person based on inference using the neural networks.

Also, a training method according to one aspect of the present disclosure includes: training a DNN model by (i) using training data that includes two or more modal information items and ground truth labels of the two or more modal information items and (ii) performing knowledge distillation that is a technique in which knowledge obtained as a result of a teacher model being trained is used to train a student model, wherein the DNN model includes: two or more DNNs; and a fusion that includes a configuration in which portions of the two or more DNNs are fused and that receives an input of features that are outputs of the two or more DNNs.

An embodiment described below shows a specific example of the present disclosure. The numerical values, shapes, structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. Also, in all embodiments, the content may be combined.

EMBODIMENT

Hereinafter, an information processing device and the like according to an embodiment will be described with reference to the drawings.

Configuration of Information Processing Device 10

FIG. 1 is a block diagram showing an example of a configuration of information processing device 10 according to an embodiment.

Information processing device 10 is implemented by a computer that uses neural networks, or the like. As shown in FIG. 1, information processing device 10 includes inputter 11, fusion DNN (Deep Neural Network) model 12, and outputter 13. When multi-modal information is input, information processing device 10 performs inference processing by using fusion DNN model 12, and outputs an inference result that is a result of the inference processing.

The present embodiment will be described by taking an example in which the emotion of a target person is determined based on inference using neural networks, but the present embodiment is not limited to this example.

Inputter 11

Inputter 11 receives an input of multi-modal information, separates the multi-modal information into two or more modal information items, and inputs the two or more modal information items to fusion DNN model 12.

Here, the multi-modal information is information of a plurality of modal elements including visual information, auditory information, olfactory information, taste information, and haptic information, and is also referred to as "multi-information". The multi-modal information may be information regarding a target person including video image information, sound information, heartbeat information, and the like of the target person, or may be information regarding a target object including video image information of the target object, sensing information of the target object, and the like. In the present embodiment, the multi-modal information includes two or more modal information items, and may include three or more modal information.

In the case where information processing device 10 is caused to determine the emotion of a target person, the two or more modal information items includes sound information and video image information of a moving image in which the target person is shown.

Outputter 13

Outputter 13 outputs an inference result that is a result of inference processing performed by fusion DNN model 12.

In the case where information processing device 10 is caused to determine the emotion of a target person, processing device 10 outputs the emotion of the target person as an inference result obtained through inference performed by fusion DNN model 12. Here, the emotion of the target person that is output is one of eight emotions of the target person that is inferred from two modal information regarding the target person input by inputter 11, or in other words, sound information and video image information of a moving image in which the target person is shown. The eight emotions include, for example, neutral, calm, happy, sad, angry, fearful, disgust, and surprised emotions.

Fusion DNN Model 12

Fusion DNN model 12 performs inference processing by being used by a computer that includes a processor and a memory. Fusion DNN model 12 performs inference processing on two or more modal information items input from inputter 11, and outputs an inference result.

In the case where information processing device 10 is caused to determine the emotion of a target person, fusion DNN model 12 performs inference processing on two or more modal information items including sound information and video image information of a moving image in which the target person is shown, and outputs the emotion of the target person as an inference result.

Figure 2:
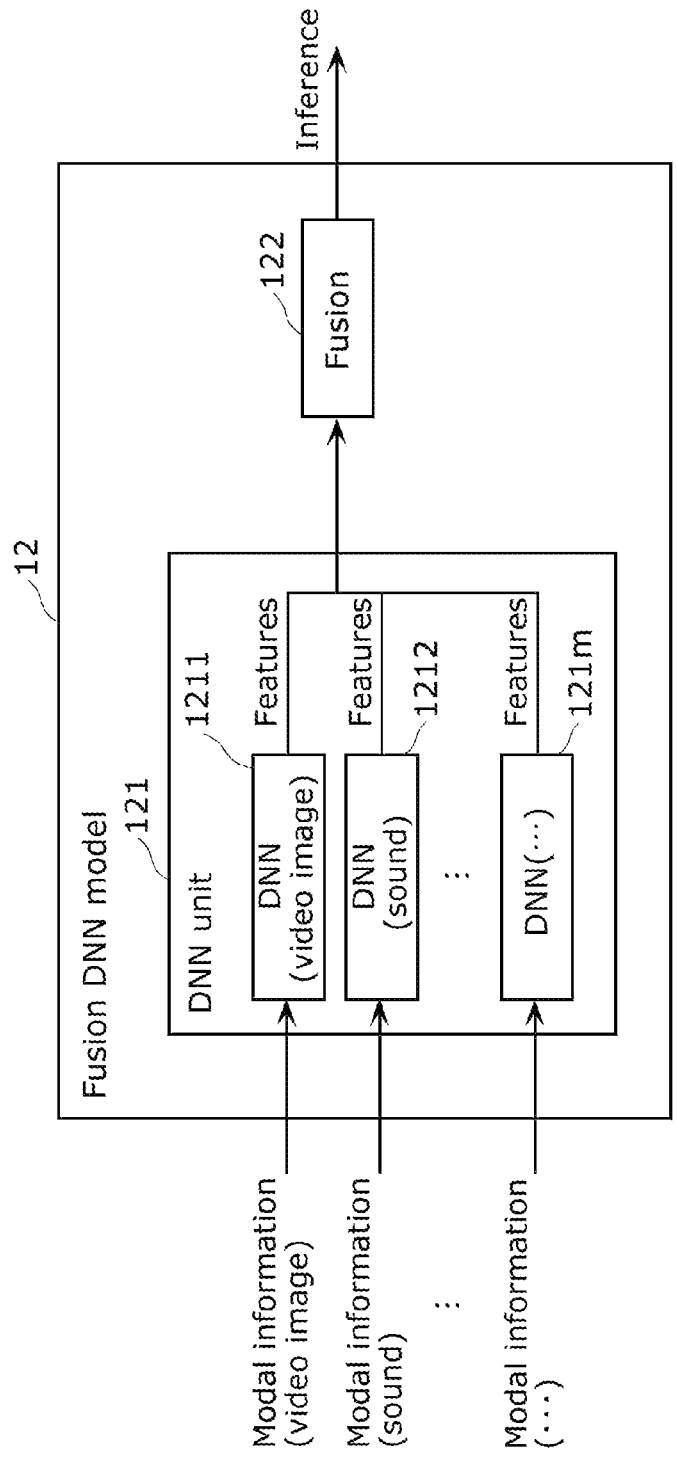
FIG. 2 is a block diagram showing an example of a configuration of a fusion DNN model shown in FIG. 1.

FIG. 2 is a block diagram showing an example of a configuration of fusion DNN model 12 shown in FIG. 1.

In the present embodiment, as shown in FIG. 2, fusion DNN model 12 includes DNN unit 121 and fusion 122 (fusion unit 122).

<DNN Unit 121>

DNN unit 121 includes two or more DNNs. DNN unit 121 calculates, based on each of the two or more modal information items that have been input, features of each of the input two or more modal information items, and outputs the features. Here, final layers included in the two or more DNNs may be fully connected layers that output the features that are outputs of the two or more DNNs.

In the present embodiment, as shown in FIG. 2, DNN unit 121 includes DNN (video image) 1211, DNN (sound) 1212, . . . , and DNN ( . . . ) 121$m$ (m is an integer of 3 or more).

«DNN (Video Image) 1211»

DNN (video image) 1211 receives an input of modal information (video image) of the video image included in the two or more modal information items, and then calculates features of the input modal information (video image) and outputs the features to fusion 122.

Here, an example of a detailed configuration of DNN (video image) 1211 will be described with reference to FIG. 3A, by taking an example in which information processing device 10 is caused to determine the emotion of a target person.

Figure 3A:
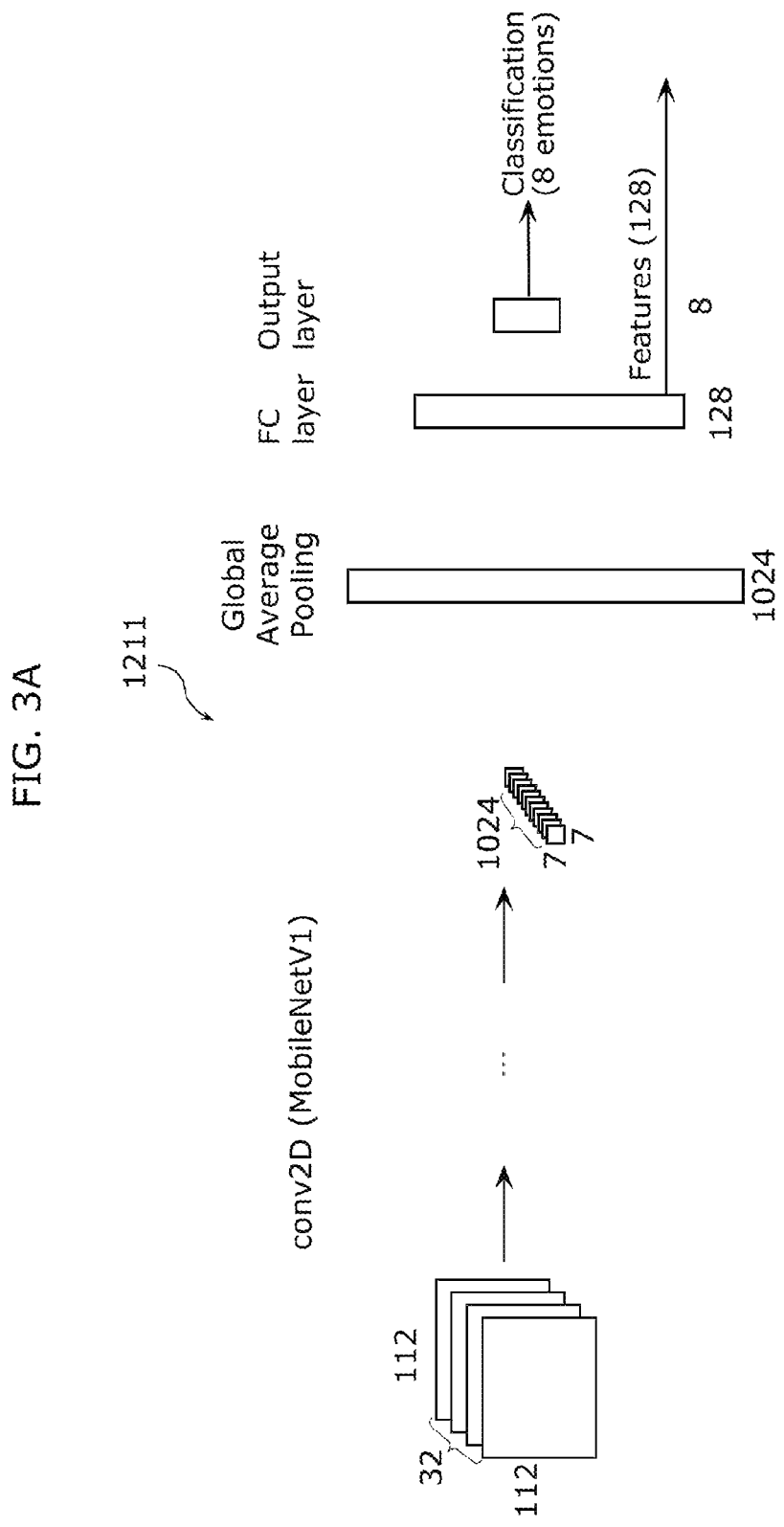
FIG. 3A is a diagram conceptually showing an example of a detailed configuration of a DNN (video image) shown in FIG. 2.

FIG. 3A is a diagram conceptually showing an example of a detailed configuration of DNN (video image) 1211 shown in FIG. 2.

Specifically, as shown in FIG. 3A, DNN (video image) 1211 includes a Conv2D layer, a Global Average Pooling layer, an FC layer, and an output layer.

The Conv2D layer is a convolution layer that outputs two-dimensional feature maps obtained by performing convolution to extract features of modal information (video image). The Conv2D layer may be, for example, Mobile Net-V1 that sequentially performs convolution in the spatial direction and the channel direction, but the present disclosure is not limited thereto. The Conv2D layer may be, for example, a multi-layered convolution layer that simultaneously performs convolution in the spatial direction and the channel direction.

The Global Average Pooling layer (GAP layer) averages the outputs of the feature maps output from the Conv2D layer and outputs the result.

The FC layer is also referred to as a fully connected layer, and flattens two-dimensional data output from the Global Average Pooling layer (transforms the two-dimensional data into one-dimensional data), and outputs the resulting data. In the example shown in FIG. 3A, the FC layer outputs 128 features.

The output layer performs classification by performing a conversion to probability using a softmax function based on the output from the fully connected layer and maximizing the probability correctly classified into each region. In the example shown in FIG. 3A, the output layer includes eight nodes and performs eight emotion classification. The output layer may not necessarily be included in DNN (video image) 1211. In the case where the FC layer outputs 128 features to fusion 122, this output layer may also be referred to as "intermediate layer", and the FC layer may also be referred to as "final layer".

«DNN (Sound) 1212»

DNN (sound) 1212 receives an input of modal information (sound) of the sound included in the two or more modal information items, and then calculates features of the input modal information (sound) and outputs the features to fusion 122.

Here, an example of a detailed configuration of DNN (sound) 1212 will be described with reference to FIG. 3B, by taking an example in which information processing device 10 is caused to determine the emotion of a target person.

Figure 3B:
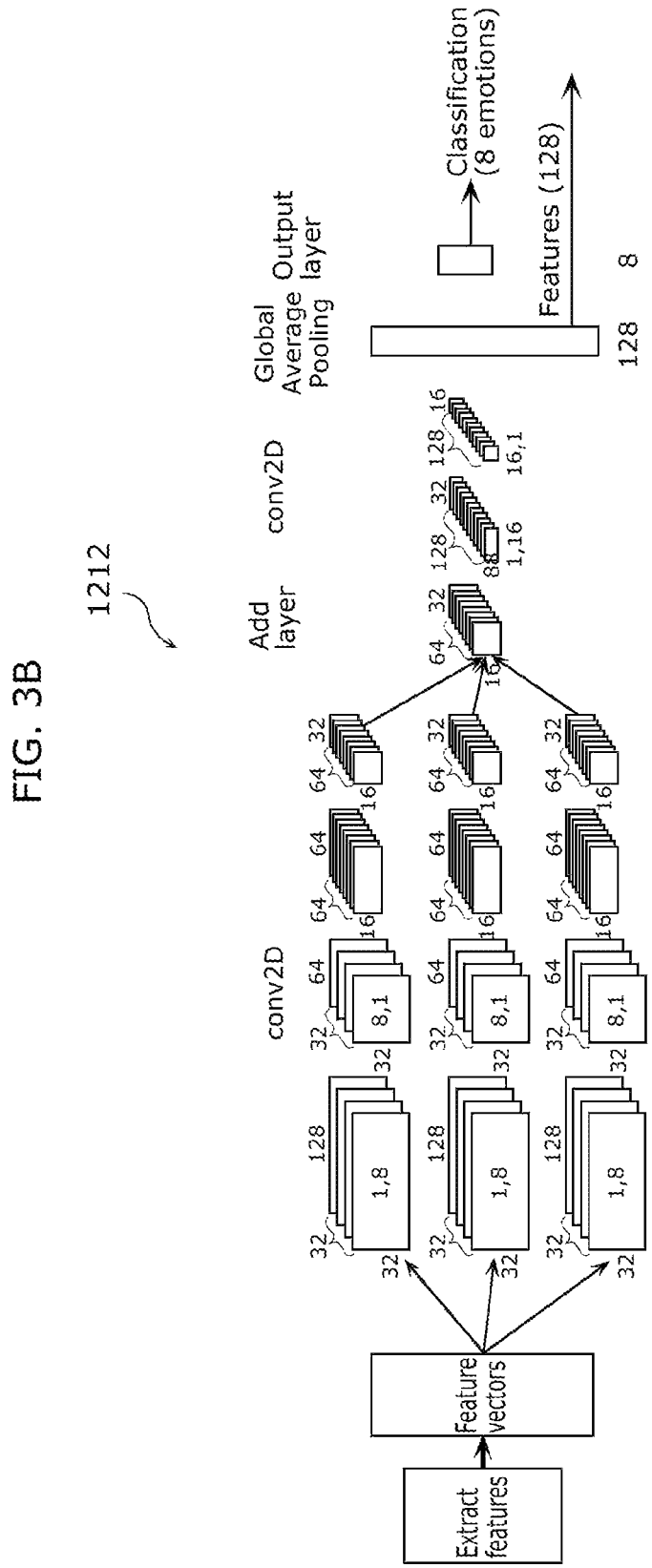
FIG. 3B is a diagram conceptually showing an example of a detailed configuration of a DNN (sound) shown in FIG. 2.

FIG. 3B is a diagram conceptually showing an example of a detailed configuration of DNN (sound) 1212 shown in FIG. 2.

Specifically, for example, as shown in FIG. 3B, DNN (sound) 1212 includes a feature extractor, a feature vector calculator, a Conv2D layer, an ADD layer, a Global Average Pooling layer, and an output layer.

The feature extractor extracts features of the modal information (sound). In the example shown in FIG. 3B, the feature extractor extracts, from the modal information (sound), for example, features such as MFCC (Mel Frequency Cepstrum Coefficient). The MFCCs are features that represent spectral schemes by taking human auditory characteristics into consideration.

The feature vector calculator calculates vectors of the features extracted by the feature extractor (hereinafter, referred to as "feature vectors").

The preceding Conv2D layer is a convolution layer that outputs feature maps obtained by performing convolution to extract features of the feature vectors calculated by the feature vector calculator.

The ADD layer adds a plurality of inputs from the Conv2D layer.

The succeeding Conv2D layer is a convolution layer that outputs feature maps obtained by performing convolution to extract features of the total obtained by the ADD layer.

The Global Average Pooling layer (GAP layer) outputs the average of the outputs of the feature maps output by the succeeding Conv2D layer. The GAP layer may be an FC layer.

The output layer performs classification by performing a conversion to probability using a softmax function based on the output from the Global Average Pooling layer and maximizing the probability correctly classified into each region. In the example shown in FIG. 3B, the output layer includes eight nodes and performs eight emotion classification. The output layer may not necessarily be included in DNN (sound) 1212. In the case where the GAP layer outputs 128 features to fusion 122, this output layer may also be referred to as "intermediate layer", and the GAP layer may also be referred to as "final layer".

«DNN ( . . . ) 121*m*»

DNN ( . . . ) 121*m* receives an input of corresponding modal information ( . . . ) in the two or more modal information items, and then calculates features of the input modal information ( . . . ) and outputs the features to fusion 122.

The detailed configuration varies depending on the corresponding modal information ( . . . ), and may be a configuration suitable for features that need to be calculated from the corresponding modal information ( . . . ).

<Fusion 122>

Fusion 122 has a configuration in which portions of the two or more DNNs that constitute DNN unit 121 are fused and to which features that are outputs of the two or more DNNs are input. More specifically, fusion 122 includes a layer in which the final layers of the two or more DNNs are connected and to which features that are outputs of the two or more DNNs are input. Fusion 122 performs inference from the input features.

Here, an example of a detailed configuration of fusion 122 will be described with reference to FIG. 3C, by taking an example in which information processing device 10 is caused to determine the emotion of a target person.

Figure 3C:
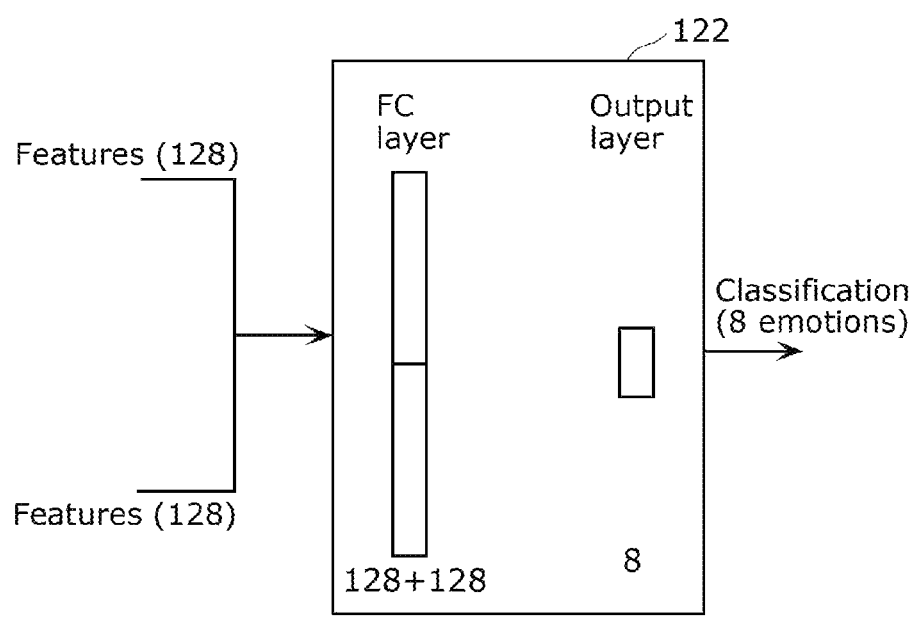
FIG. 3C is a diagram conceptually showing an example of a detailed configuration of a fusion shown in FIG. 2.

FIG. 3C is a diagram conceptually showing an example of a detailed configuration of fusion 122 shown in FIG. 2.

Specifically, for example, as shown in FIG. 3C, fusion 122 may include an FC layer and an output layer.

The FC layer is a layer in which portions (for example, final layers) of the two or more DNNs that constitute DNN unit 121 such as a FC layer and a Global Average Pooling layer are fused and to which features that are outputs of the two or more DNNs are input. In the example shown in FIG. 3C, the FC layer is a layer in which the FC layer of DNN (video image) 1211 and the Global Average Pooling layer of DNN (sound) 1212 are fused as portions of the two or more DNNs. The FC layer outputs, as features, vectors of 256 features, that is, a total of vectors of features output from the FC layer of DNN (video image) 1211 and DNN (sound) 1212, as features.

The output layer performs classification by performing a conversion to probability using a softmax function based on the output from the preceding FC layer and maximizing the probability correctly classified into each region. In the example shown in FIG. 3C as well, the output layer includes eight nodes, and performs eight emotion classification.

The output of fusion DNN model 12 configured as described above is an inference result for the two or more modal information items obtained as the output of fusion 122.

Next, a description of training device 20 for training fusion DNN model 12 configured as described above will be given.

Training Device 20

FIG. 4 is a block diagram showing an example of a configuration of training device 20 according to the embodiment.

Training device 20 is implemented by a computer that includes a processor (microprocessor) such as a CPU, a memory, and the like. For example, as shown in FIG. 4, training device 20 includes acquirer 21, training processing unit 22, and model unit 23.

<Acquirer 21>

Acquirer 21 acquires training data that includes two or more modal information items and ground truth labels of the two or more modal information items. Acquirer 21 may also acquire distillation labels (soft targets) from model unit 23.

<Training Processing Unit 22>

Training processing unit 22 performs training that uses knowledge distillation on a model stored in model unit 23 by using the training data acquired by acquirer 21. Training processing unit 22 includes a processor and a memory (not shown), and the processor performs training processing by using a program recorded in the memory.

More specifically, training processing unit 22 trains a fusion DNN model by using the training data and also performing knowledge distillation. The fusion DNN model is an example of a DNN model. As described above, a fusion DNN model includes two or more DNNs and a fusion that has a configuration in which portions of the two or more DNNs are fused and to which features that are outputs of the two or more DNNs are input. Also, fusion 122 has a configuration in which portions of two or more DNNs are fused and to which features that are outputs of the two or more DNNs are input. More specifically, fusion 122 includes a layer in which the final layers of the two or more DNNs are connected and to which features that are outputs of the two or more DNNs are input.

A description of knowledge distillation will now be given here.

Knowledge distillation is a technique that is also called distillation, and in which knowledge obtained as a result of a teacher model being trained is used to train a student model.

Typically, knowledge distillation is a process in which a large and complex neural network that serves as a teacher model is trained, and the output of the trained teacher model is used as knowledge to train a small and lightweight neural network that serves as a student model. With this configuration, it is possible to obtain a model that is a student model, which is a small and lightweight neural network, and yet has a level of precision as high as that of the teacher model.

In the present embodiment, knowledge distillation is performed by using models of the same architecture as a student model and a teacher model. By doing so, the knowledge of the teacher model is distilled to the student model that is a model of the same architecture, as a result of which, it is possible to obtain inference precision higher than that of the teacher model, or in other words, it is possible to further improve inference precision.

<Model Unit 23>

Model unit 23 stores models including neural networks to be trained by training processing unit 22. The models stored in model unit 23 are trained through knowledge distillation by training processing unit 22.

In the present embodiment, model unit 23 stores, as a model to be trained, a fusion DNN model, two or more DNNs that constitute the fusion DNN model, and a fusion that constitutes the fusion DNN model.

Operation of Training Device 20

Next, a description of an example of an operation performed by training device 20 configured as described above will be given below.

Figure 5:
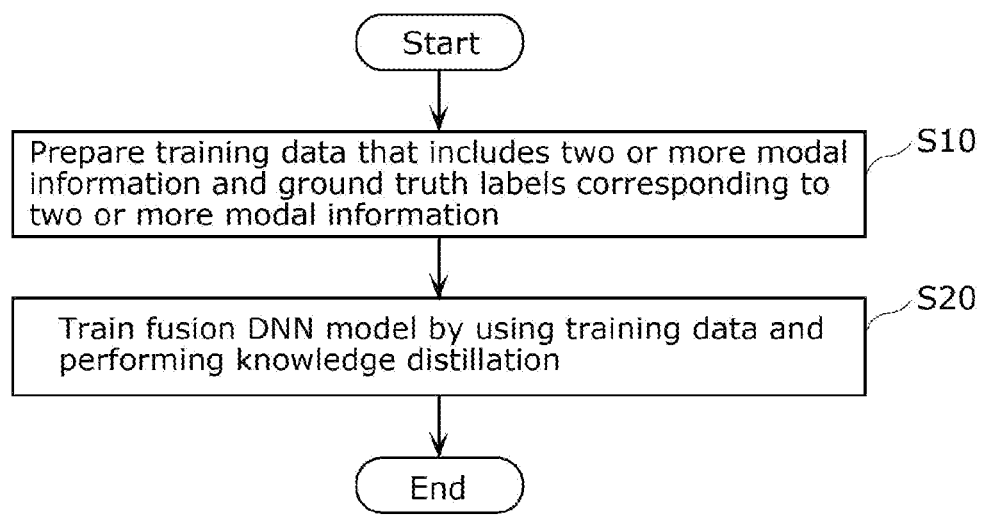
FIG. 5 is a flowchart illustrating the processing of a training method according to an embodiment.

FIG. 5 is a flowchart illustrating the processing of a training method according to the embodiment.

Training device 20 includes a processor and a memory, and performs the processing of steps S10 and S20 described below by using the processor and a program recorded in the memory.

More specifically, first, training device 20 prepares training data that includes two or more modal information items and ground truth labels of the two or more modal information items (S10).

Next, training device 20 trains fusion DNN model 12 by using the training data prepared in step S10 and also performing knowledge distillation (S20).

Advantageous Effects, Etc.

In the manner as described above, training device 20 can train fusion DNN model 12 that is a neural network by performing knowledge distillation, in addition to using, instead of a single modal information item, training data including two or more modal information items and ground truth data of the two or more modal information items.

More specifically, training device 20 trains fusion DNN model 12 by using two or more modal information items, and thus the precision of inference results using the neural network can be improved as compared with the case where fusion DNN model 12 is trained by using a single modal information item. Furthermore, as a result of knowledge distillation training being performed on fusion DNN model 12, it is possible to further improve the precision of inference results using the neural network as compared with the case where training is performed by using two or more modal information items.

Hereinafter, specific aspects of methods for training fusion DNN models through knowledge distillation according to the present embodiment will be described by way of Examples 1 to 3.

Example 1

First, in Example 1, a training method will be described in which an individual component of fusion DNN model 12 that serves as a teacher model is trained, and after that, an individual component of fusion DNN model 12 that serves as a student model is subjected to knowledge distillation training. Hereinafter, a description will be given of a configuration and the like in the case where information processing device 10 is caused to determine the emotion of a target person. However, it is merely an example, and thus the present disclosure is not limited thereto.

Figure 6A:
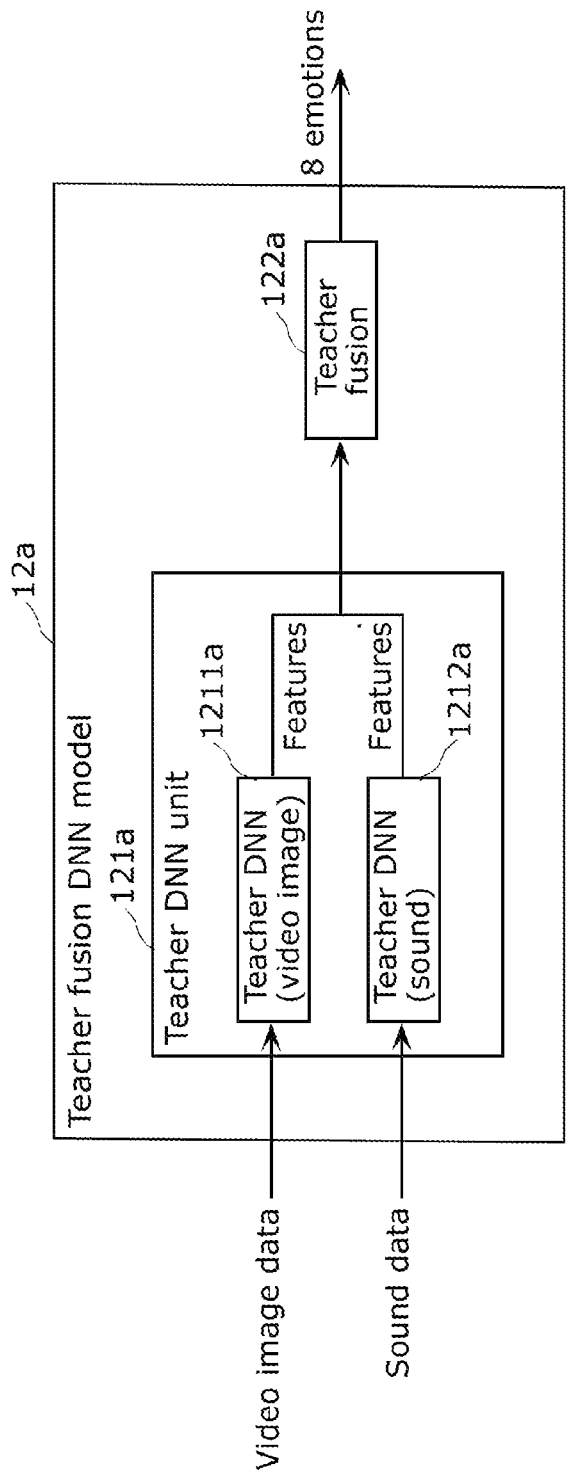
FIG. 6A is a block diagram showing an example of a configuration of a teacher fusion DNN model according to Example 1.
Figure 6B:
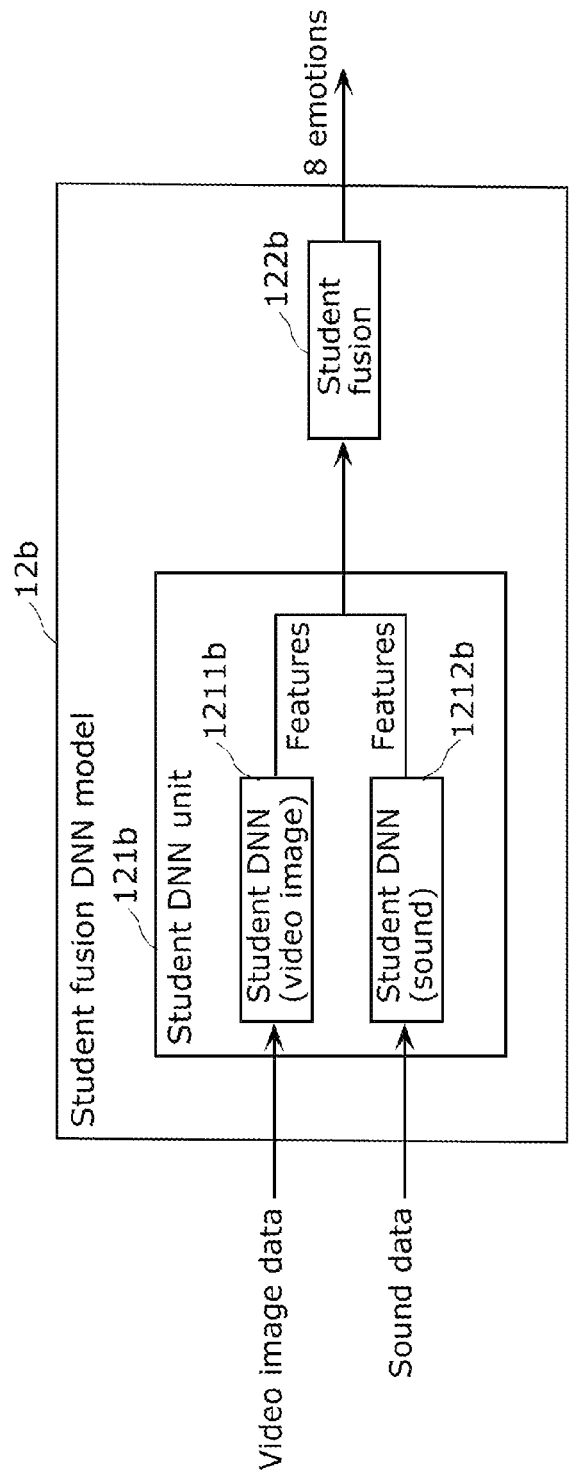
FIG. 6B is a block diagram showing an example of a configuration of a student fusion DNN model according to Example 1.

FIG. 6A is a block diagram showing an example of a configuration of teacher fusion DNN model 12a according to Example 1. FIG. 6B is a block diagram showing an example of a configuration of student fusion DNN model 12b according to Example 1. Teacher fusion DNN model 12a and student fusion DNN model 12b are models of the same architecture, and have the same configuration as that of fusion DNN model 12 described above.

As shown in FIG. 6A, teacher fusion DNN model 12a includes teacher DNN unit 121a and teacher fusion 122a (teacher fusion unit 122a). Teacher DNN unit 121a includes teacher DNN (video image) 1211a and teacher DNN (sound) 1212a.

A detailed configuration of teacher DNN (video image) 1211a is the same as that of DNN (video image) 1211 shown in FIG. 3A, and a detailed configuration of teacher DNN (sound) 1212a is also the same as that of DNN (sound) 1212 shown in FIG. 3B. Also, a detailed configuration of teacher fusion 122a is the same as that of fusion 122 shown in FIG.

3C. For this reason, a description of detailed configurations of teacher DNN (video image) 1211a, teacher DNN (sound) 1212a, and teacher fusion 122a will be omitted here.

Teacher fusion DNN model 12a configured as described above corresponds to fusion DNN model 12 shown in FIG. 2 in which DNN unit 121 includes only two DNNs. Teacher fusion DNN model 12a receives an input of two modal information including modal information (video image) and modal information (sound) and outputs eight classified emotions as an inference result. Also, in FIG. 6A, the modal information (video image) and the modal information (sound) are expressed as video image data and sound data.

As shown in FIG. 6B, student fusion DNN model 12b includes student DNN unit 121b and student fusion 122b (student fusion unit 122b). Student DNN unit 121b includes student DNN (video image) 1211b and student DNN (sound) 1212b.

A detailed configuration of student DNN (video image) 1211b is the same as that of DNN (video image) 1211 shown in FIG. 3A, and the detailed configuration of student DNN (sound) 1212b is the same as that of DNN (sound) 1212 shown in FIG. 3B. Also, a detailed configuration of student fusion 122b is the same as that of fusion 122 shown in FIG. 3C. For this reason, a description of detailed configurations of student DNN (video image) 1211b, student DNN (sound) 1212b, and student fusion 122b will be omitted here.

Student fusion DNN model 12b configured as described above corresponds to fusion DNN model 12 shown in FIG. 2 in which DNN unit 121 includes only two DNNs, and that receives an input of two modal information including modal information (video image) and modal information (sound) and outputs eight classified emotions as an inference result. Also, in FIG. 6B as well, the modal information (video image) and the modal information (sound) are expressed as video image data and sound data.

Figure 7:
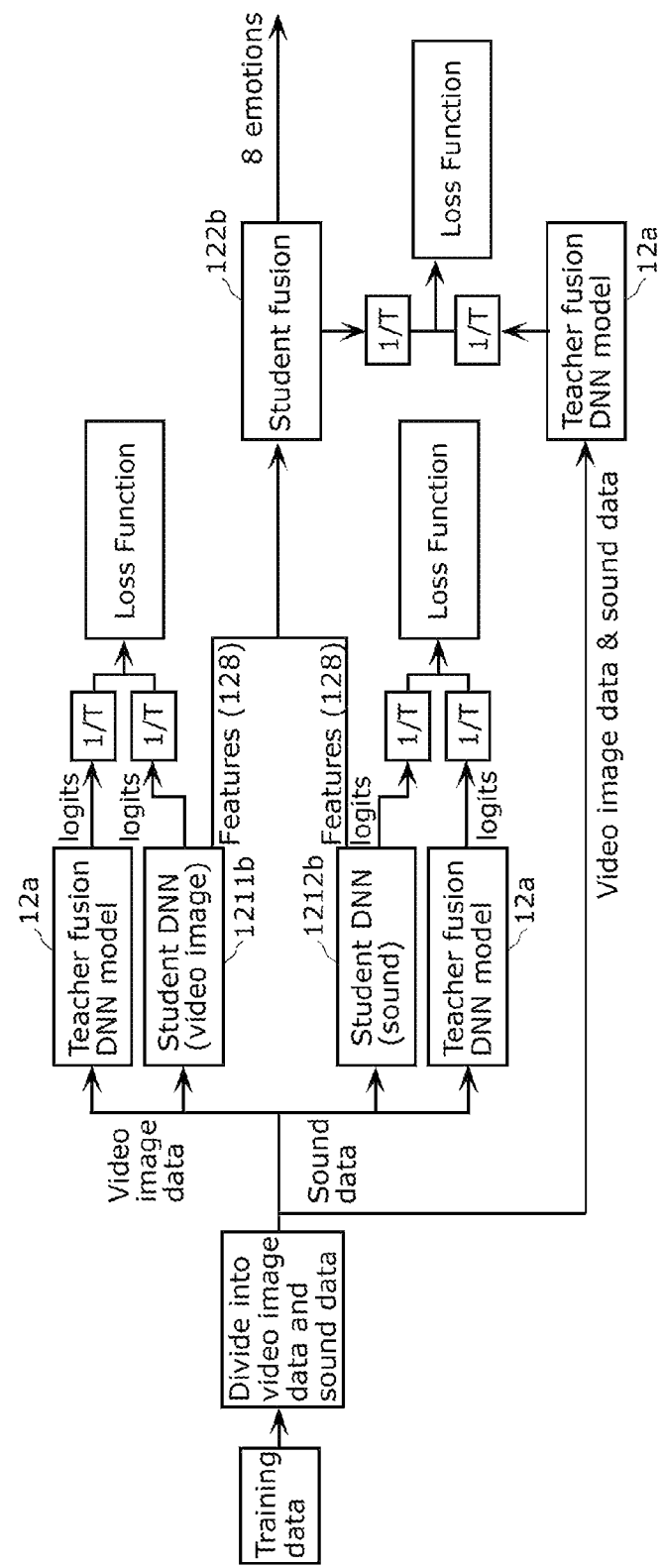
FIG. 7 is a diagram conceptually showing a training method according to Example 1.

FIG. 7 is a diagram conceptually showing the training method according to Example 1.

As shown in FIG. 7, in the training method according to Example 1, an individual component of student fusion DNN model 12b is trained by using the output of trained teacher fusion DNN model 12a as a distillation label (soft target).

More specifically, student DNN (video image) 1211b is subjected to knowledge distillation training by using the output of trained teacher fusion DNN model 12a as a distillation label. In the example shown in FIG. 7, knowledge distillation training based on an error function is performed by using, as the output of trained teacher fusion DNN model 12a and the output of student DNN (video image) 1211b, the outputs of a softmax function with temperature using values obtained by dividing logits by temperature parameter T as input. The error function used here may be, for example, L2 norm, or may be MAE (Mean Absolute Error). Also, logits refers to the output (variable) of the immediately preceding layer input to the softmax function.

Likewise, student DNN (sound) 1212b is subjected to knowledge distillation training by using the output of trained teacher fusion DNN model 12a as a distillation label. In the example shown in FIG. 7, knowledge distillation training based on an error function is performed by using, as the output of trained teacher fusion DNN model 12a and the output of student DNN (sound) 1212b, the outputs of the softmax function with temperature using values obtained by dividing logits by temperature parameter T as input. The error function used here may also be, for example, L2 norm or MAE.

Also, student fusion 122b is subjected to knowledge distillation training by using the output of trained teacher fusion DNN model 12a as a distillation label.

Next, the processing of the training method according to Example 1 conceptually shown in FIG. 7 will be described with reference to FIG. 8.

Figure 8:
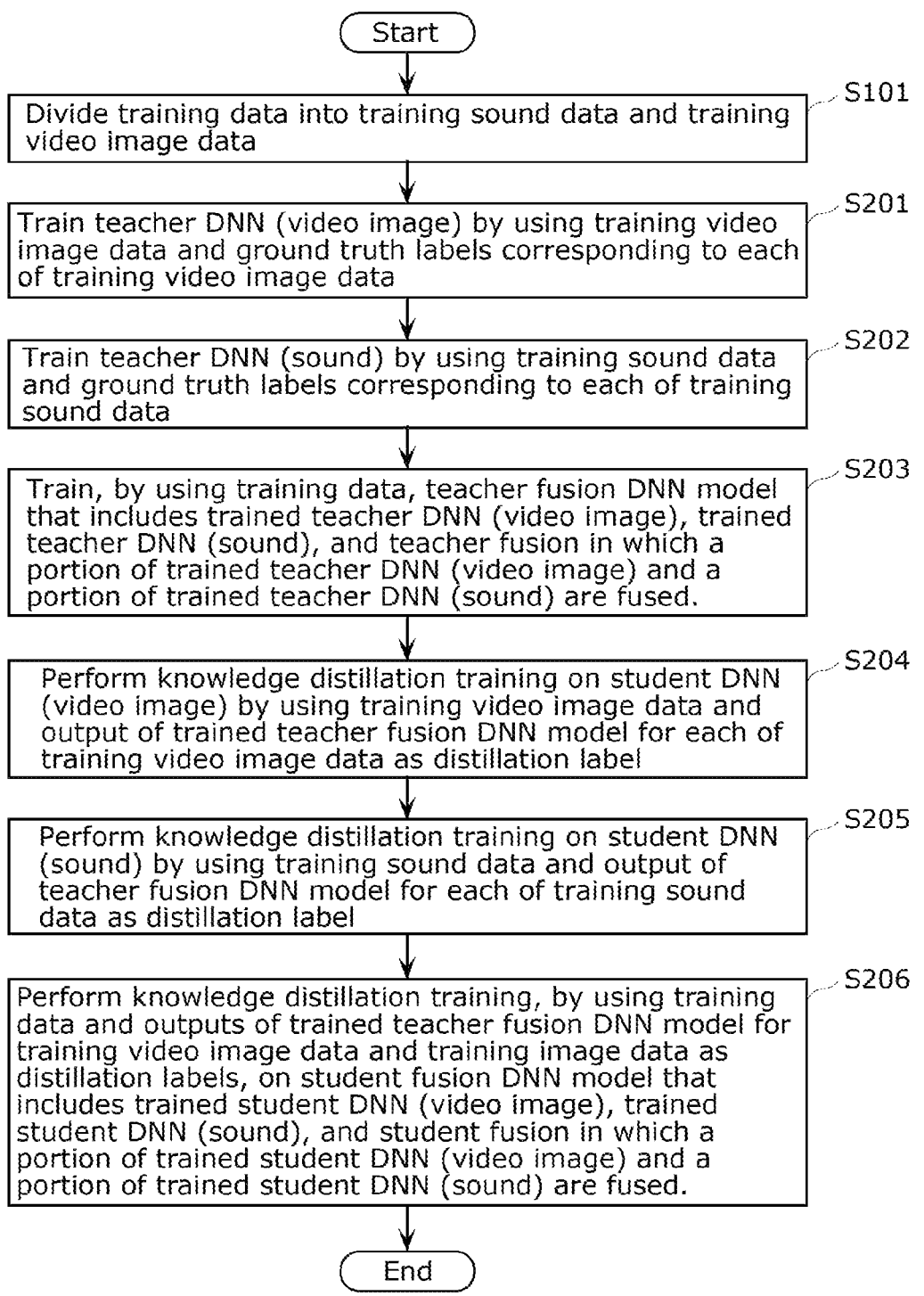
FIG. 8 is a flowchart illustrating the processing of the training method according to Example 1.

FIG. 8 is a flowchart illustrating the processing of the training method according to Example 1. FIG. 9 is a diagram showing the processing of the training method shown in FIG. 8, expressed using a flow of data and a flow of DNN models. In FIGS. 8 and 9, the modal information (video image) and the modal information (sound) are expressed as video image data and sound data.

Training device 20 includes a processor and a memory, and performs the processing of steps S101 to S206 described below by using the processor and a program recorded in the memory.

More specifically, first, training device 20 divides training data into training sound data and training video image data (S101). Also, training device 20 stores teacher fusion DNN model 12a in model unit 23 as a model to be trained.

Next, training device 20 trains teacher DNN (video image) 1211a included in teacher fusion DNN model 12a by using the training video image data and ground truth labels of the video image data (S201).

Next, training device 20 trains teacher DNN (sound) 1212a included in teacher fusion DNN model 12a by using the training sound data and ground truth labels of the sound data (S202).

Next, training device 20 trains teacher fusion DNN model 12a by using the training data, or in other words, the training video image data, the sound data, and the corresponding ground truth labels (S203). Here, teacher fusion DNN model 12a that is trained includes teacher fusion 122a, teacher DNN (video image) 1211a trained in step S201, and teacher DNN (sound) 1212a trained in step S202. Teacher fusion 122a has a configuration in which a portion of teacher DNN (video image) 1211a trained in step S201 and a portion of teacher DNN (sound) 1212a trained in step S202 are fused.

Next, training device 20 performs knowledge distillation training on student DNN (video image) 1211b included in student fusion DNN model 12b by using the training video image data and the output of trained teacher fusion DNN model 12a for the video image data as a distillation label (S204). Prior to performing step S204, training device 20 stores student fusion DNN model 12b in model unit 23 as a model to be trained.

Next, training device 20 performs knowledge distillation training on student DNN (sound) 1212b included in student fusion DNN model 12b by using the training sound data and the output of trained teacher fusion DNN model 12a for the sound data as a distillation label (S205).

Next, training device 20 performs knowledge distillation training on student fusion DNN model 12b by using the training data and the output of trained teacher fusion DNN model 12a for the training sound data and the video image data as a distillation label (S206). Here, student fusion DNN model 12b that is subjected to knowledge distillation training includes student fusion 122b, student DNN (video image) 1211b that was subjected to knowledge distillation training in step S204, and student DNN (sound) 1212b that was subjected to knowledge distillation training in step S205. Student fusion 122b has a configuration in which a portion of student DNN (video image) 1211b that was subjected to knowledge distillation training in step S204 and a portion of student DNN (sound) 1212b that was subjected to knowledge distillation training in step S205 are fused.

In steps S204, S205, and S206, the output of trained teacher fusion DNN model 12a for the training sound data and the video image data may be used as a common distillation label. When a large number of outputs of trained teacher fusion DNN model 12a are used as the common distillation label, it is possible to obtain precision of the inference result that is comparable to that when respective distillation labels are used in steps S204, S205, and S206, and thus this configuration is useful.

In the foregoing, an example was described in which knowledge distillation training is performed on an individual component of fusion DNN model 12 that receives an input of two modal information including modal information (video image) and modal information (sound) respectively representing video image data and sound data and outputs eight classified emotions as an inference result, but the present disclosure is not limited thereto.

A configuration may be possible in which two or more modal information items are input, and knowledge distillation training is performed on fusion DNN model 12 that outputs an inference result including a classification result.

In this case, training device 20 stores models that have the same architecture as that of fusion DNN model 12 shown in FIG. 2 as a teacher model and a student model, and after an individual component of the teacher model has been trained, the student model is subjected to knowledge distillation training in the same manner as described above.

The processing of the training method in this case will be described with reference to FIG. 10.

FIG. 10 is a flowchart illustrating the processing of the training method according to Example 1 in which two or more modal information items are used. Hereinafter, the case will be described where knowledge distillation training is performed on an individual component of fusion DNN model 12 that is a student model by using the output of fusion DNN model 12 that is a trained teacher model as a common distillation label. When a small number of data is used as the common distillation label, as described with reference to FIG. 8, the output of a fusion DNN model that is a trained teacher model for each modal information may be used as a distillation label.

Training device 20 includes a processor and a memory, and performs the processing of steps S211 to S214 described below by using the processor and a program recorded in the memory.

More specifically, first, training device 20 stores fusion DNN model 12 shown in FIG. 2 that serves as a teacher model in model unit 23 as a model to be trained.

Next, training device 20 trains first teacher models that are models having the same configuration as two or more DNNs that constitute DNN unit 121 by using corresponding first modal information in two or more modal information items included in training data and a ground truth label of the corresponding first modal information (S211). Here, the first teacher models are DNN (video image) 1211, DNN (sound) 1212, . . . , and DNN ( . . . ) 121m included in fusion DNN model 12 shown in FIG. 2 that serves as a teacher model. Each of the first teacher models is trained by using corresponding modal information and a ground truth label.

Next, training device 20 trains fusion DNN model 12 that serves as a teacher model, or in other words, a teacher fusion DNN model by using training data that includes two or more modal information items and corresponding ground truth labels (S212). Here, the teacher fusion DNN model is a model having the same configuration (or in other words, the same architecture) as that of fusion DNN model 12, and includes a fusion that serves as a teacher model, or in other words, a teacher fusion and the first teacher models trained in step S211. The teacher fusion is a model that includes a configuration in which portions of the first teacher models trained in step S211 are fused and to which features that are outputs of the first teacher models trained in step S211 are input.

Next, training device 20 performs knowledge distillation training on each of the two or more DNNs as a student model by using a distillation label that is the output of the teacher fusion DNN model trained in step S212 and corresponding first modal information in the two or more modal information items (S213). This distillation label is output when the two or more modal information items are input to the teacher fusion DNN model trained in step S212. This distillation label is treated as a ground truth during knowledge distillation training performed in step S213.

Next, training device 20 performs knowledge distillation training on a fusion DNN model as a student model by using the distillation label that is the output of the teacher fusion DNN model trained in step S212 and the two or more modal information items (S214). This distillation label is treated as a ground truth during knowledge distillation training performed in step S214.

As described above, with the training method and the like of Example 1, it is possible to train fusion DNN model 12 that is a neural network by performing knowledge distillation in addition to using, instead of a single modal information item, training data including two or more modal information items and ground truth data of the two or more modal information items.

Accordingly, with the training method and the like of Example 1, training is performed by using two or more modal information items, and thus, the precision of inference results using the neural network can be improved as compared with the case where training is performed by using a single modal information item. Furthermore, by performing knowledge distillation, it is possible to further improve the precision of inference results using the neural network as compared with the case where training is performed by using two or more modal information items.

Accordingly, with the training method and the like of Example 1, it is possible to further improve the precision of inference results using the neural network.

Example 2

Next, in Example 2, a training method will be described in which a fusion DNN model that serves as a teacher model is trained, and after that, knowledge distillation training is performed on the output of a fusion DNN model that serves as a student model by using the output of an intermediate layer included therein and a distillation label. Hereinafter, a configuration and the like in the case where information processing device 10 is caused to determine the emotion of a target person will be described, but they are merely an example, and thus the present disclosure in not limited thereto.

Figure 11A:
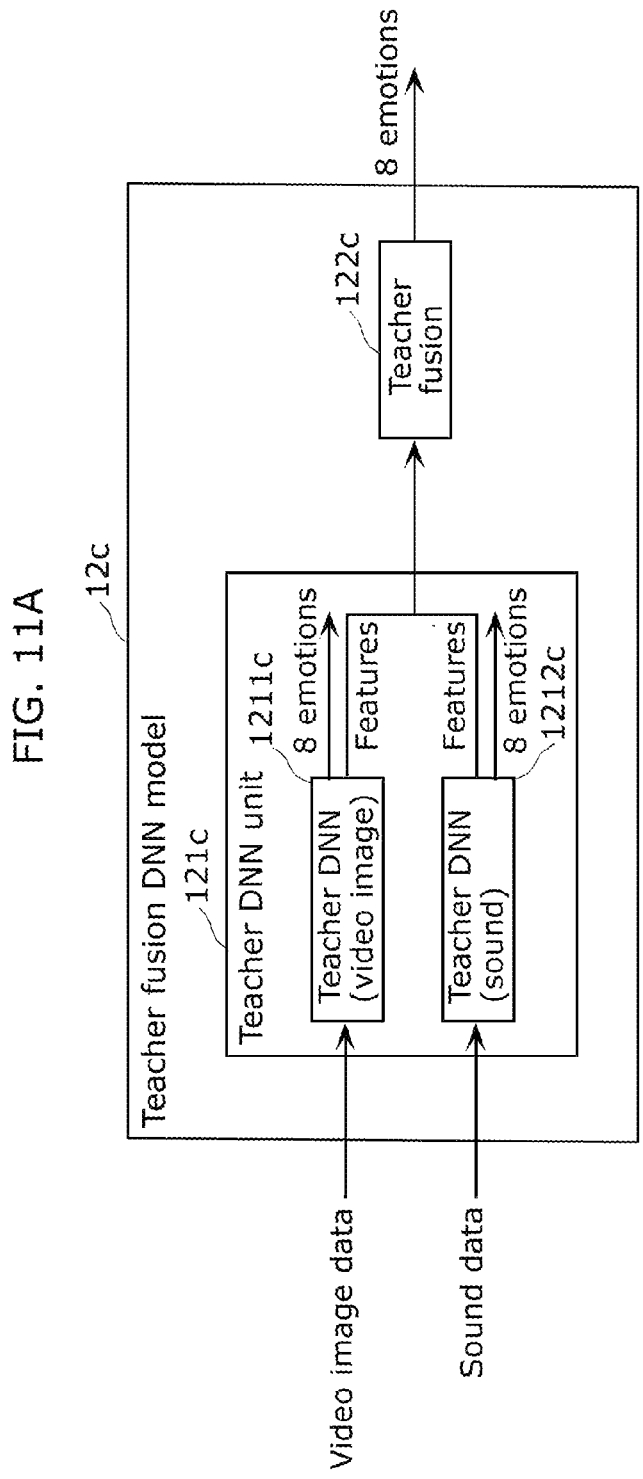
FIG. 11A is a block diagram showing an example of a configuration of a teacher fusion DNN model according to Example 2.
Figure 11B:
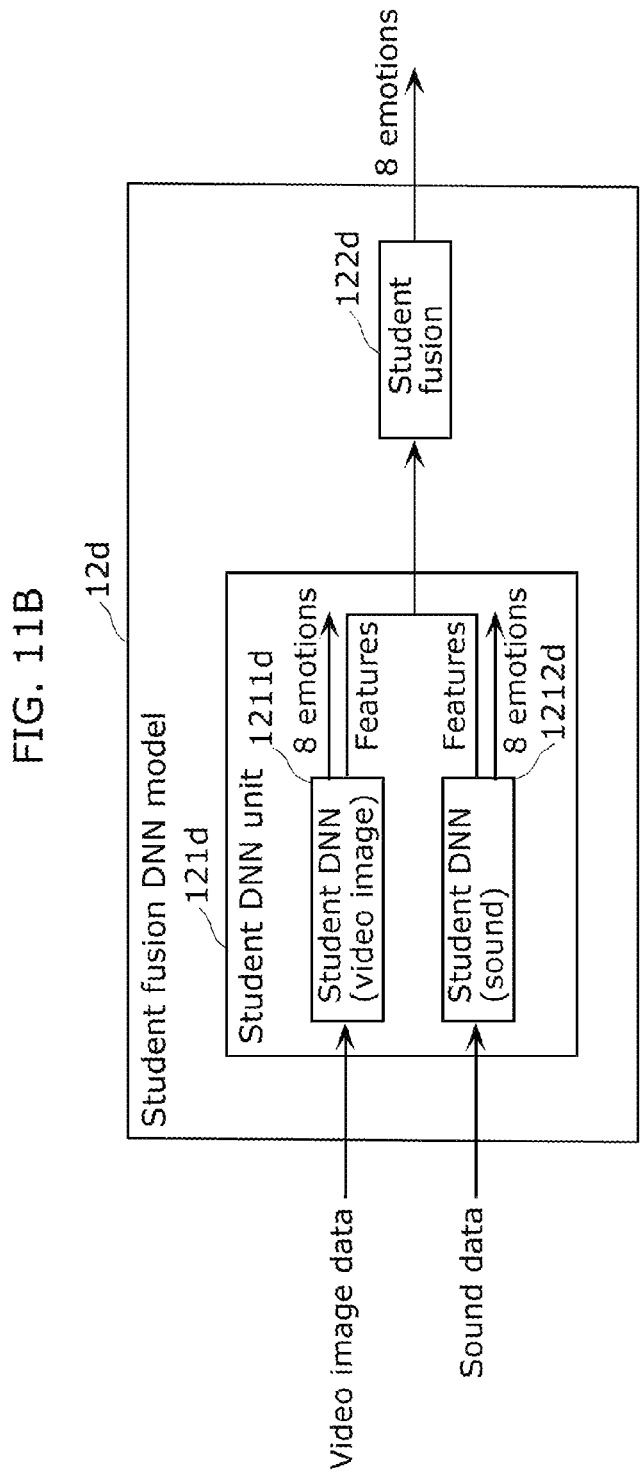
FIG. 11B is a block diagram showing an example of a configuration of a student fusion DNN model according to Example 2.

FIG. 11A is a block diagram showing an example of a configuration of teacher fusion DNN model 12c according to Example 2. FIG. 11B is a block diagram showing an example of a configuration of student fusion DNN model 12d according to Example 2. Teacher fusion DNN model 12c and student fusion DNN model 12d are models of the same architecture, and have the same configuration as that of fusion DNN model 12 described above.

As shown in FIG. 11A, teacher fusion DNN model 12c includes teacher DNN unit 121c and teacher fusion 122c (teacher fusion unit 122c). Teacher DNN unit 121c includes teacher DNN (video image) 1211c and teacher DNN (sound) 1212c.

A detailed configuration of teacher DNN (video image) 1211c is the same as that of DNN (video image) 1211 shown in FIG. 3A, and a detailed configuration of teacher DNN (sound) 1212c is the same as that of DNN (sound) 1212 shown in FIG. 3B. Accordingly, a description of detailed configurations thereof will be omitted here. As shown in FIG. 11A, teacher DNN (video image) 1211c and teacher DNN (sound) 1212c each output features and also output an inference result, or in other words, classified eight emotions. In this example, teacher DNN (video image) 1211c and teacher DNN (sound) 1212c each output an inference result, or in other words, classified eight emotions from a layer other than the layer that outputs features. Hereinafter, the layer other than the layer that outputs features will be referred to as "intermediate layer".

Also, a detailed configuration of teacher fusion 122c is the same as that of fusion 122 shown in FIG. 3C, and thus a description of a detailed configuration thereof will be omitted here.

Teacher fusion DNN model 12c configured as described above corresponds to fusion DNN model 12 shown in FIG. 2 in which DNN unit 121 includes only two DNNs, and that receives an input of two modal information including modal information (video image) and modal information (sound) and outputs eight classified emotions as an inference result. Also, in FIG. 11A as well, the modal information (video image) and the modal information (sound) are expressed as video image data and sound data.

As shown in FIG. 11B, student fusion DNN model 12d includes student DNN unit 121d and student fusion 122d. Student DNN unit 121d includes student DNN (video image) 1211d and student DNN (sound) 1212d.

A detailed configuration of student DNN (video image) 1211d is the same as that of DNN (video image) 1211 shown in FIG. 3A, and a detailed configuration of student DNN (sound) 1212d is the same as that of DNN (sound) 1212 shown in FIG. 3B. Accordingly, a description of detailed configurations thereof will be omitted here. As shown in FIG. 11B, student DNN (video image) 1211d and student DNN (sound) 1212d each output features and also output an inference result, or in other words, classified eight emotions. In this example, student DNN (video image) 1211d and student DNN (sound) 1212d each output an inference result, or in other words, classified eight emotions from a layer other than the layer that outputs features. Hereinafter, the layer other than the layer that outputs features will be referred to as "intermediate layer".

Also, a detailed configuration of student fusion 122d is the same as that of fusion 122 shown in FIG. 3C, and thus a description of a detailed configuration thereof will be omitted here.

Student fusion DNN model 12d configured as described above corresponds to fusion DNN model 12 shown in FIG. 2 in which DNN unit 121 includes only two DNNs, and that receives an input of two modal information including modal information (video image) and modal information (sound) and outputs eight classified emotions as an inference result. Also, in FIG. 11B as well, the modal information (video image) and the modal information (sound) are expressed as video image data and sound data.

Figure 12:
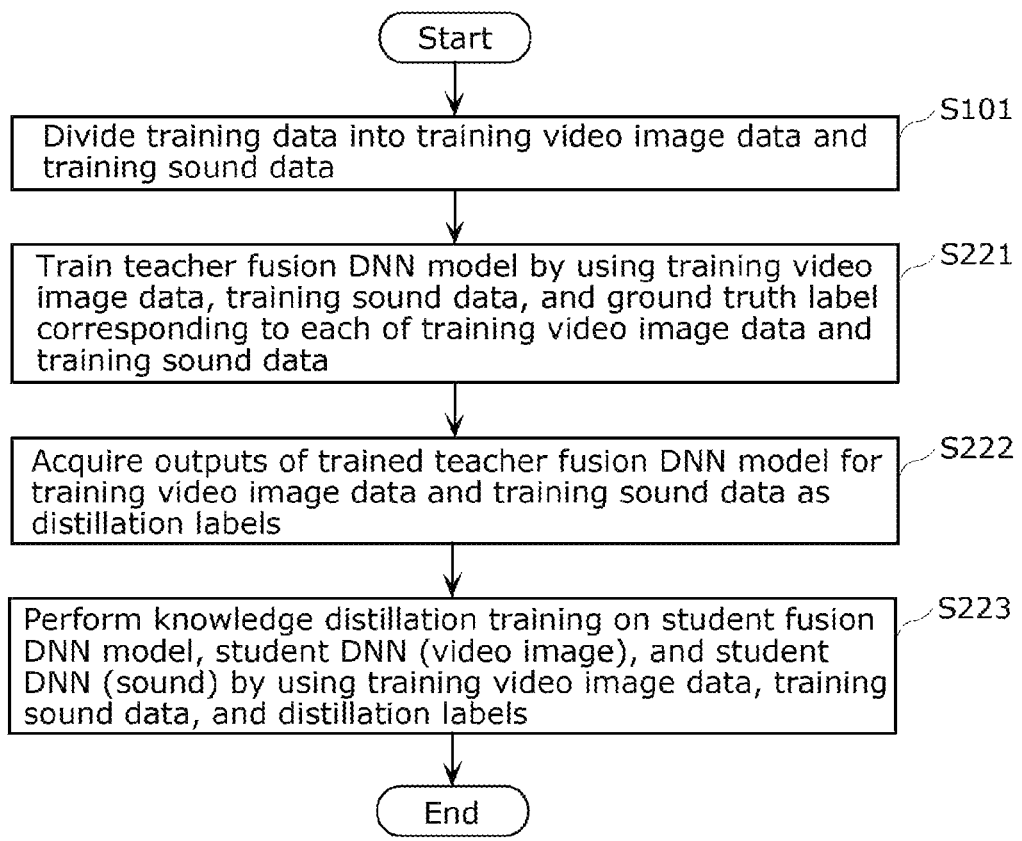
FIG. 12 is a flowchart illustrating the processing of a training method according to Example 2.
Figure 13:
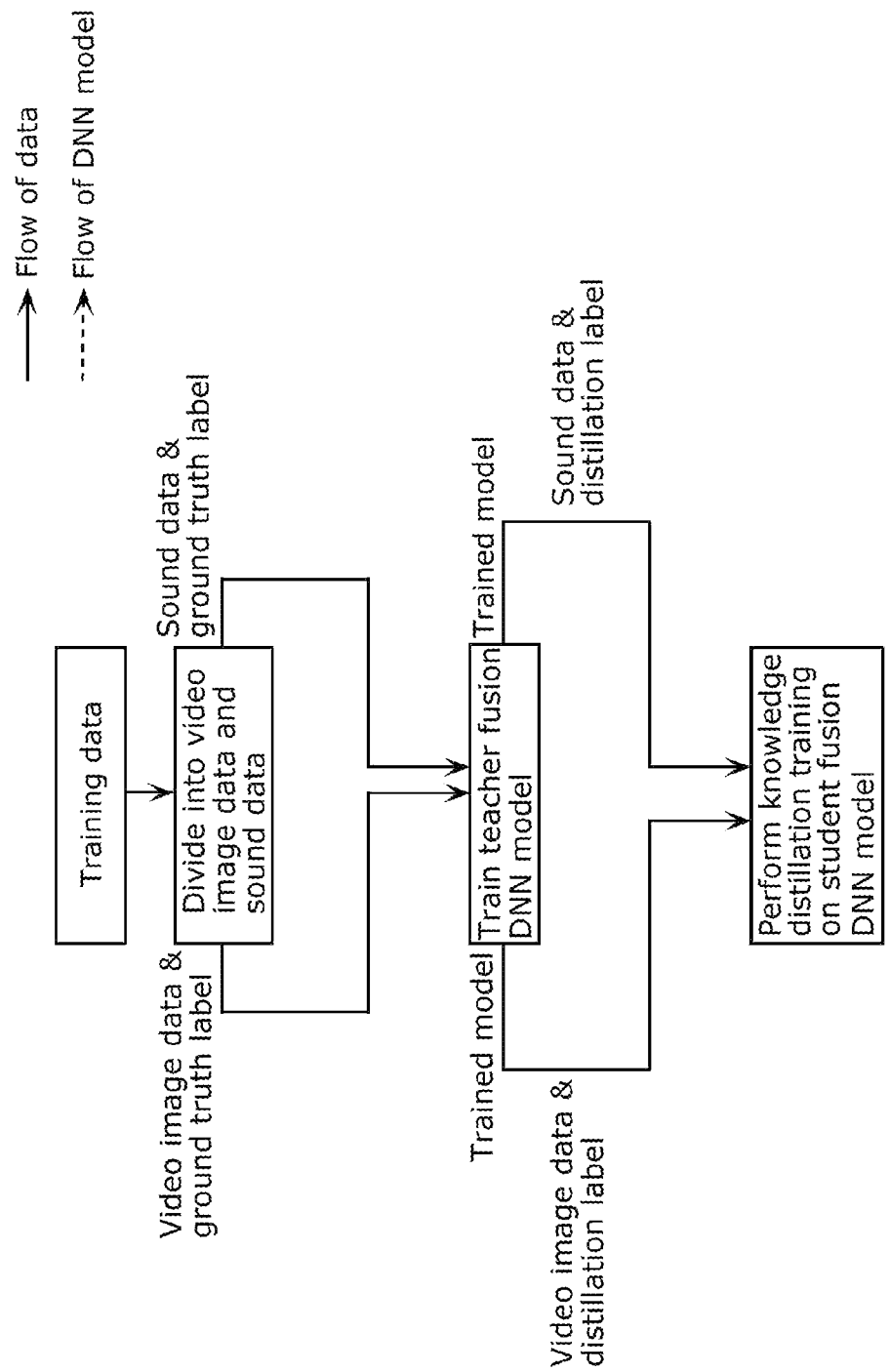
FIG. 13 is a diagram showing the processing of the training method shown in FIG. 12, expressed using a flow of data and a flow of DNN models.

FIG. 12 is a flowchart illustrating the processing of the training method according to Example 2. FIG. 13 is a diagram sowing the processing of the training method shown in FIG. 12, expressed using a flow of data and a flow of DNN models. In FIGS. 12 and 13, the modal information (video image) and the modal information (sound) are expressed as video image data and sound data. Hereinafter, the case will be described where the output of a fusion DNN model that serves as a trained teacher model is used as a common distillation label. When a small number of data is used as the common distillation label, as described in Example 1, the output of a fusion DNN model that serves as a trained teacher model for each modal information may be used as a distillation label. FIG. 13 shows the processing of the training method shown in FIG. 12 in this case. Accordingly, in the processing of the training method described below, video image data & distillation label and sound data & distillation label refer to video image data and sound data & distillation label.

Training device 20 includes a processor and a memory, and performs the processing of steps S101 to S223 described below by using the processor and a program recorded in the memory.

More specifically, first, training device 20 divides training data into training sound data and training video image data (S101). Also, training device 20 stores teacher fusion DNN model 12c in model unit 23 as a model to be trained.

Next, training device 20 trains teacher fusion DNN model 12c by using the training video image data and the training sound data and ground truth labels of the video image data and the sound data (S221).

Next, training device 20 acquires the output of trained teacher fusion DNN model 12c for the training video image data and the training sound data as a distillation label (S222). This distillation label is, for example, a result of eight emotion classification (inference result).

Next, training device 20 performs knowledge distillation training on student fusion DNN model 12d by using the training video image data and the training sound data, and the distillation label acquired in step S222 (S223). More specifically, training device 20 performs knowledge distillation training on student fusion DNN model 12d by using the training video image data and the training sound data, and the distillation label acquired in step S222. At the same time, training device 20 performs knowledge distillation training on student DNN (video image) 1211d and student DNN (sound) 1212d by using the training video image data and the training sound data, and the distillation label acquired in step S222.

In the foregoing, an example was described in which knowledge distillation training is performed on fusion DNN model 12 that receives an input of two modal information including modal information (video image) and modal information (sound) respectively representing video image data and sound data and outputs eight classified emotions as an inference result, but the present disclosure is not limited thereto.

Knowledge distillation training may be performed on fusion DNN model 12 that receives an input of two or more modal information items and outputs an inference result including a classification result.

In this case, training device 20 stores models that have the same architecture as that of fusion DNN model 12 shown in FIG. 2 as a teacher model and a student model, and after the teacher model has been trained, the student model is subjected to knowledge distillation training in the same manner as described above by using the output of the intermediate layer of the trained teacher model.

The processing of the training method in this case will be described with reference to FIG. 14.

Figure 14:
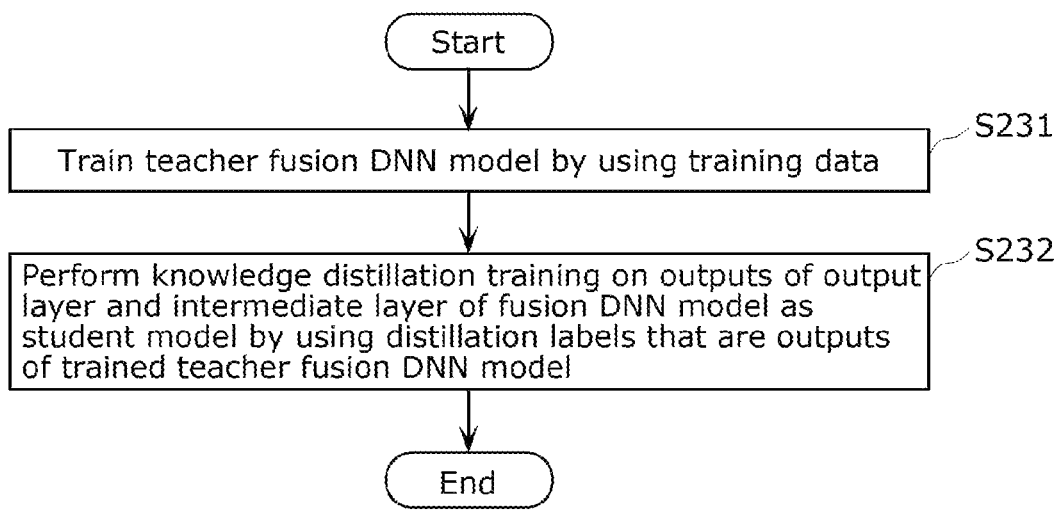
FIG. 14 is a flowchart illustrating the processing of the training method according to Example 2 in which two or more modal information items are used.

FIG. 14 is flowchart illustrating the processing of the training method according to Example 2 in which two or more modal information items are used.

Training device 20 includes a processor and a memory, and performs the processing of steps S231 to S232 described below by using the processor and a program recorded in the memory. The teacher model and the student model used in the processing of steps S231 and S232 are fusion DNN models 12 of the same architecture.

More specifically, first, training device 20 stores fusion DNN model 12 shown in FIG. 2 that serves as a teacher model in model unit 23 as a model to be trained.

Next, training device 20 trains, by using training data, a teacher fusion DNN model, or in other words, fusion DNN model 12 that serves as a teacher model (S231).

Next, training device 20 performs knowledge distillation training on the output of fusion DNN model that serves as a student model and the output of the intermediate layer thereof by using a distillation label that is the output of teacher fusion DNN model trained in step S231 (S232). Here, the distillation label is the output of the trained teacher fusion DNN model, and is, for example, an inference result such as a result of eight emotion classification. Also, this distillation label is used in step S232 as a ground truth of the output of the fusion DNN model that serves as a student model and a ground truth of the output of the intermediate layer included in the fusion DNN model that serves as a student model.

As described above, with the training method and the like of Example 2, it is possible to train fusion DNN model 12 that is a neural network by performing knowledge distillation in addition to using, instead of a single modal information item, training data including two or more modal information items and ground truth data of the two or more modal information items.

Accordingly, with the training method and the like of Example 2, training is performed by using two or more modal information items, and thus, the precision of inference results using the neural network can be improved as compared with the case where training is performed by using a single modal information item. Also, by performing knowledge distillation, it is possible to further improve the precision of inference results using the neural network as compared with the case where training is performed by using two or more modal information items.

Accordingly, with the training method and the like of Example 2, it is possible to further improve the precision of inference results using the neural network.

Furthermore, as a result of performing the training method of Example 2, even if the number of two or more modal information items that are input is smaller than the number of two or more DNNs that constitute trained fusion DNN model 12, trained fusion DNN model 12 can properly operate and output an inference result.

Also, with the training method according to Example 2, training and knowledge distillation are performed on a student model and a teacher model that are the same DNN models, and it is therefore unnecessary to perform pre-training for each single modal information item, which was conventionally required to perform knowledge distillation, as a result of which, it is possible to reduce the number of steps required to perform learning.

Also, with the training method according to Example 2, unlike the training method according to Example 1, it is unnecessary to train an individual component of fusion DNN model 12 by using a single modal information item, and it is therefore possible to reduce the number of steps required to perform learning.

Example 3

Next, in Example 3, a training method will be described in which, by applying knowledge distillation technology, training and knowledge distillation training are performed simultaneously on a fusion DNN model. Hereinafter, a configuration and the like in the case where information processing device 10 is caused to determine the emotion of a target person will be described, but they are merely an example, and thus the present disclosure in not limited thereto.

Figure 15:
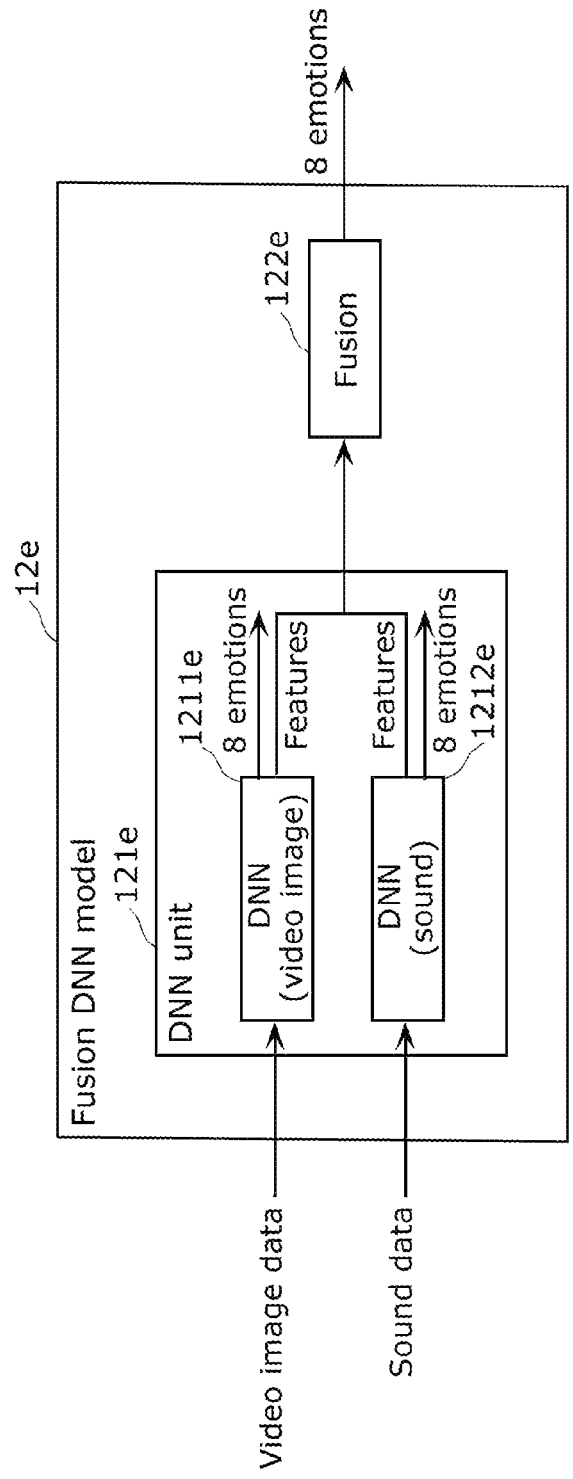
FIG. 15 is a block diagram showing an example of a configuration of a fusion DNN model according to Example 3.

FIG. 15 is a block diagram showing an example of a configuration of fusion DNN model 12e according to Example 3. Fusion DNN model 12e shown in FIG. 15 is a model of the same architecture as fusion DNN model 12 shown in FIG. 2 in which DNN unit 121 includes only two DNNs.

As shown in FIG. 15, fusion DNN model 12e includes DNN unit 121e and fusion 122e. DNN unit 121e includes DNN (video image) 1211e and DNN (sound) 1212e.

A detailed configuration of DNN (video image) 1211e is the same as that of DNN (video image) 1211 shown in FIG. 3A, and a detailed configuration of DNN (sound) 1212e is the same as that of DNN (sound) 1212 shown in FIG. 3B. Accordingly, a description of detailed configurations thereof will be omitted here. As shown in FIG. 15, DNN (video image) 1211e and DNN (sound) 1212e each output features and also output an inference result, or in other words, classified eight emotions. In this example as well, a description will be given assuming that DNN (video image) 1211e and DNN (sound) 1212e each output an inference result, or in other words, classified eight emotions from an intermediate layer that is a layer other than the layer that outputs features.

Also, a detailed configuration of fusion 122e is the same as that of fusion 122 shown in FIG. 3C, and thus a description of a detailed configuration thereof will be omitted here.

Fusion DNN model 12e configured as described above corresponds to fusion DNN model 12 shown in FIG. 2 in which DNN unit 121 includes only two DNNs, and that receives an input of two modal information including modal information (video image) and modal information (sound) and outputs eight classified emotions as an inference result. Also, in FIG. 15 as well, the modal information (video image) and the modal information (sound) are expressed as video image data and sound data.

Figure 16:
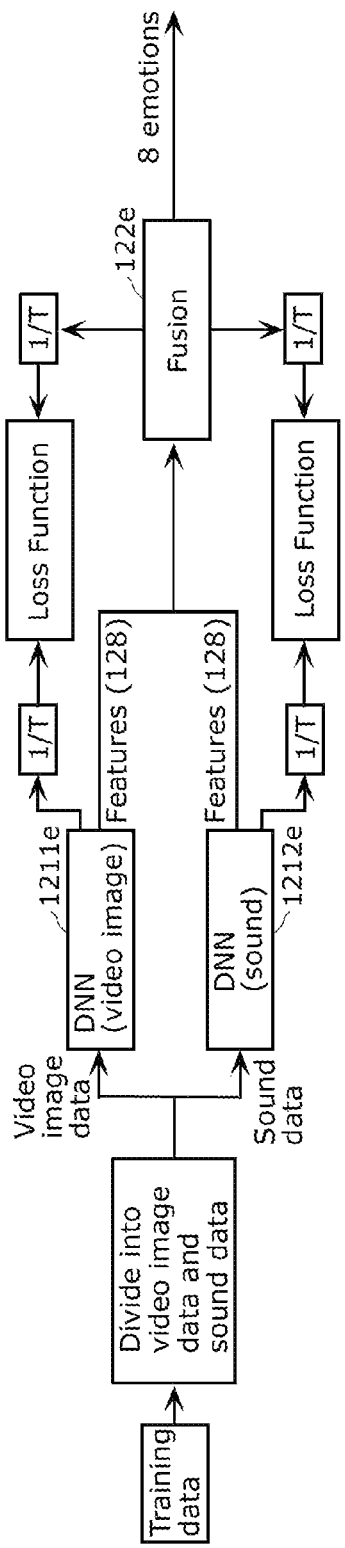
FIG. 16 is a diagram conceptually showing a training method according to Example 3.

FIG. 16 is a diagram conceptually showing a training method according to Example 3.

As shown in FIG. 16, in the training method according to Example 3, training (normal training) is performed on fusion DNN model 12e, and also knowledge distillation training is performed on intermediate layers of fusion DNN model 12e.

More specifically, training is performed on fusion DNN model 12e by using video image data and sound data, and corresponding ground truth labels. At the same time, when the video image data and the sound data are input to fusion DNN model 12e, 1) by using a distillation label obtained from the output of the intermediate layer of fusion 122e as a ground truth, 2) knowledge distillation training is performed on the outputs of the intermediate layers of DNN (video image) 1211e and DNN (sound) 1212e.

In the example of the knowledge distillation training shown in FIG. 16, the outputs of a softmax function with temperature obtained as the outputs of the intermediate layers of fusion 122e are used as distillation labels. Then, knowledge distillation training is performed on the outputs of a softmax function with temperature obtained as the outputs of the intermediate layers of DNN (video image) 1211e and DNN (sound) 1212 by using distillation labels. In the example shown in FIG. 16, knowledge distillation training performed based on an error function is performed by using the outputs of a softmax function with temperature, but the error function used here may be, for example, L2 norm, or may be MAE.

Figure 17:
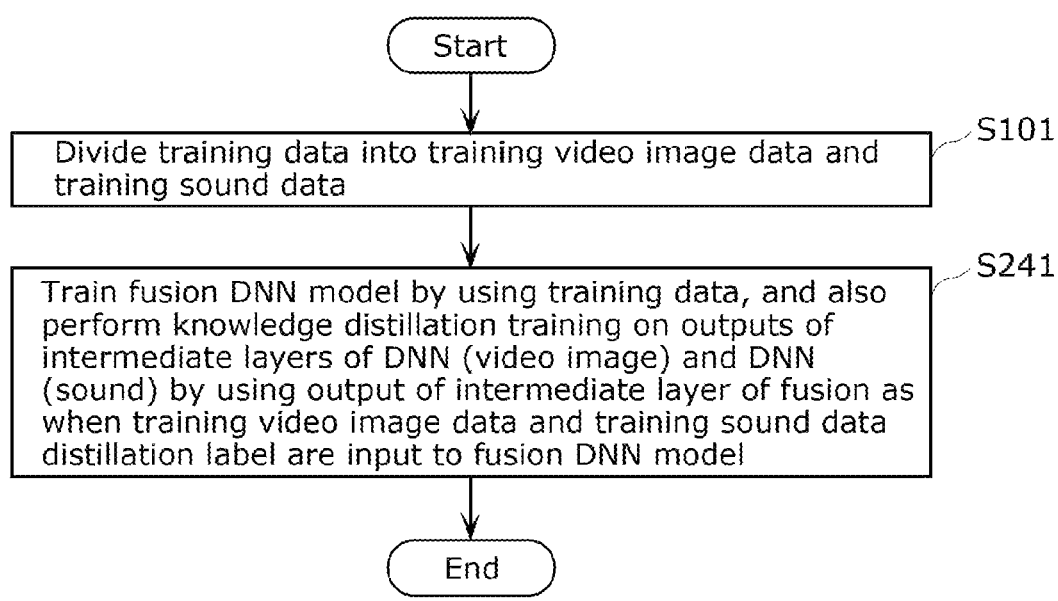
FIG. 17 is a flowchart illustrating the processing of the training method according to Example 3.
Figure 18:
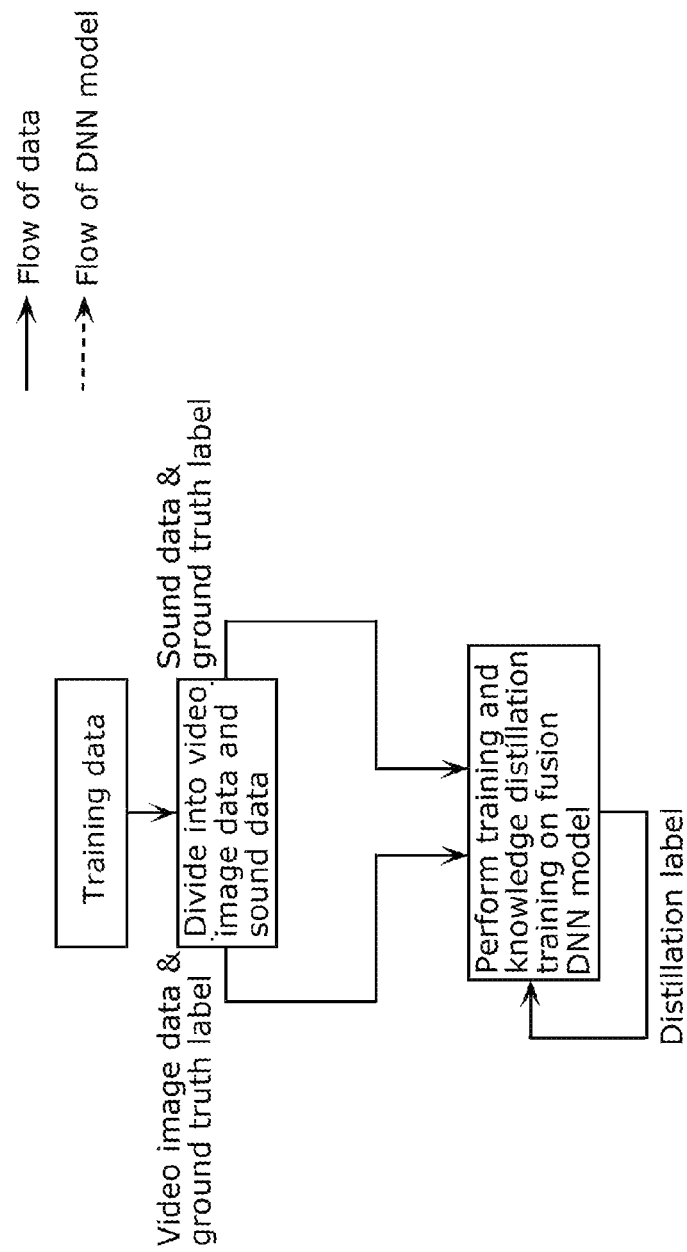
FIG. 18 is a diagram showing the processing of the training method shown in FIG. 17, expressed using a flow of data and a flow of DNN models.

FIG. 17 is a flowchart illustrating the processing of the training method according to Example 3. FIG. 18 is a diagram showing the processing of the training method shown in FIG. 17, expressed using a flow of data and a flow of DNN models. In FIGS. 17 and 18, the modal information (video image) and the modal information (sound) are expressed as video image data and sound data.

Training device 20 includes a processor and a memory, and performs the processing of steps S101 and S241 described below by using the processor and a program recorded in the memory.

More specifically, first, training device 20 divides training data into training sound data and training video image data (S101). Also, training device 20 stores fusion DNN model 12e in model unit 23 as a model to be trained.

Next, training device 20 trains fusion DNN model 12e by using training data that includes ground truth labels corresponding to the training video image data and the training sound data, and also performs knowledge distillation training on the intermediate layer of fusion DNN model 12e (S241).

Details of knowledge distillation training will be described below. Specifically, when the video image data and the sound data are input to fusion DNN model 12e, training device 20 performs knowledge distillation training on the outputs of the intermediate layers of DNN (video image) 1211e and DNN (sound) 1212e by using the output of the intermediate layer of fusion 122e as a distillation label.

In the foregoing, an example was described in which knowledge distillation training is performed on fusion DNN model 12e that receives an input of two modal information including modal information (video image) and modal information (sound) respectively representing video image data and sound data and outputs eight classified emotions as an inference result, but the present disclosure is not limited thereto.

Knowledge distillation training may be performed on fusion DNN model 12 that receives an input of two or more modal information items and outputs an inference result including a classification result.

In this case, training device 20 may store a model of the same architecture as that of fusion DNN model 12 shown in FIG. 2, and perform training and knowledge distillation training simultaneously in the same manner as described above.

The processing of the training method in this case will be described with reference to FIG. 19.

Figure 19:
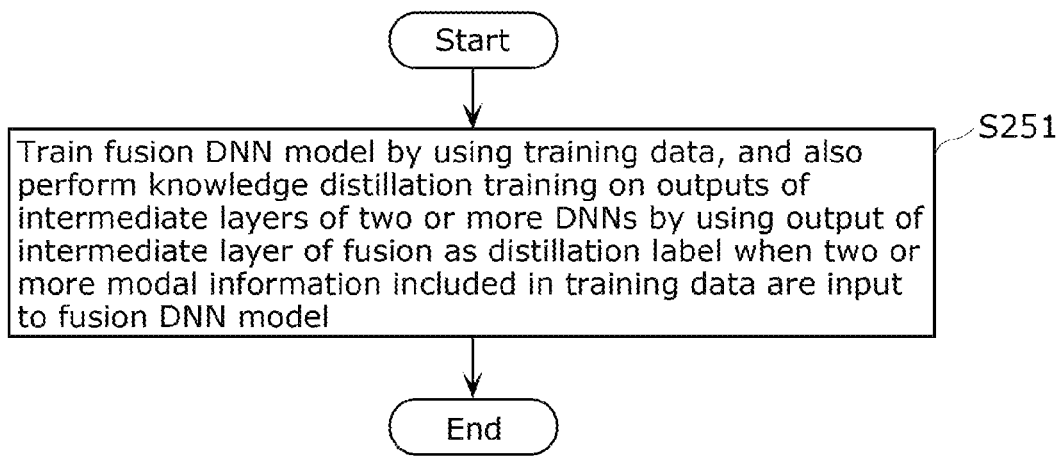
FIG. 19 is a flowchart illustrating the processing of the training method according to Example 3 in which two or more modal information items are used.

FIG. 19 is a flowchart illustrating the processing of the training method according of Example 3 in which two or more modal information items are used.

Training device 20 includes a processor and a memory, and performs the processing of step S251 described below by using the processor and a program recorded in the memory.

More specifically, first, training device 20 stores fusion DNN model 12 shown in FIG. 2 in model unit 23 as a model to be trained.

Next, training device 20 performs training on fusion DNN model 12 by using training data, and also performs knowledge distillation training on the outputs of the intermediate layers of two or more DNNs by using the output of the intermediate layer included in the fusion when two or more modal information items included in the training data are input to fusion DNN model 12 as a distillation label (S251).

As described above, with the training method and the like of Example 3, it is possible to train fusion DNN model 12 that is a neural network by performing knowledge distillation in addition to using, instead of a single modal information item, training data including two or more modal information items and ground truth data of the two or more modal information items.

Accordingly, with the training method and the like of Example 3, training is performed by using two or more modal information items, and thus, the precision of inference results using the neural network can be improved as compared with the case where training is performed by using a single modal information item. Also, by performing knowledge distillation, it is possible to further improve the precision of inference results using the neural network as compared with the case where training is performed by using two or more modal information items.

Accordingly, with the training method and the like of Example 3, it is possible to further improve the precision of inference results using the neural network.

Furthermore, as a result of performing the training method of Example 3, even if the number of two or more modal information items that are input is smaller than the number of two or more DNNs that constitute fusion DNN model 12, trained fusion DNN model 12 can properly operate and output an inference result.

Also, with the training method according to Example 3, normal training and knowledge distillation training can be performed simultaneously on single fusion DNN model 12, and it is therefore unnecessary to perform pre-training for each single modal information item, which was conventionally required to perform knowledge distillation, as a result of which, it is possible to reduce the number of steps required to perform learning.

Furthermore, with the training method according to Example 3, unlike the training method according to Example 2, it is unnecessary to train an individual component of fusion DNN model 12 by using a single modal information item, and it is therefore possible to minimize the number of times knowledge distillation training is performed and further reduce the number of steps required to perform learning.

Example 4

In Example 4, verification for the effectiveness of the training methods that use knowledge distillation described in Examples 1 to 3 was performed. The results of experiment will be described below.

In this experiment, RAVDESS (The Ryerson Audio-Visual Database of Emotional Speech and Song) was used as training data. Here, the RAVDESS is a dataset of moving images of emotional acting of 24 American English speaking participants (12 males and 12 females). One moving image has a duration of about 5 to 10 seconds, and includes 2880 speech and 2024 song moving images. Each moving image is given eight emotions including neutral, calm, happy, sad, angry, fearful, disgust, and surprised emotions, and classification tags corresponding to the eight emotions.

<Experiment Conditions>

In this experiment, training was performed using Adam optimizer by setting the learning rate to 0.0001, the batch size to 32, and other parameters to default values (initial values). The number of epochs was set to about 200 for each training, and training was terminated when training no longer proceeds with validation data. Also, as the error function (Loss Function), MAE was used.

Also, in this experiment, fusion DNN model 12 shown in FIG. 2 in which DNN unit 121 includes only two DNNs, and that receives an input of two modal information including modal information (video image) and modal information (sound) and outputs eight classified emotions as an inference result was used as a fusion DNN model. The components of the fusion DNN model were the same as those shown in FIGS. 3A to 3C.

<Result of Experiment>

In this experiment, evaluation for emotion recognition precision was performed on fusion DNN models trained by using the training methods using knowledge distillation described in Examples 1 to Example 3. The evaluation was performed based on k-fold cross validation. Here, the k-fold cross validation is known as a method for accurately verifying the generalization performance of a predictive model. In the case where evaluation is performed based on the k-fold cross validation, for example, an operation of dividing a training dataset into k subsets, performing training on k−1 subset of the k subsets, and performing evaluation (verification) on the remaining one subset is performed on all combinations. In the case of k-fold, training and evaluation is repeated k times in total.

In this experiment, the RAVDESS dataset was divided into 4-fold with respect to humans, and an operation of performing evaluation on 6 participants by using the data of 18 participants was performed 4 times. By doing so, evaluation is performed without an evaluation target person being included in training data, although this is a difficult task, the evaluation can be performed more accurately as compared with the case where evaluation based on the k-fold cross validation is performed by randomly dividing training data including 2880+2024 training data.

As a result, the following results were obtained for emotion recognition precision: about 0.73 for the training method according to Example 1; about 0.75 for the training method according to Example 2; and about 0.76 for the training method according to Example 3. As a comparative example, a training method was performed in which each component of a fusion DNN model was trained without knowledge distillation, and an emotion recognition precision of about 0.70 was obtained.

From the experiment results obtained above, it was found that, with the training methods and the like of Examples 1 to 3, it is possible to further improve the precision of inference results using the neural network.

Accordingly, the effectiveness of the training methods that use knowledge distillation described in Examples 1 to 3 was verified.

Possibility of Other Embodiments

Up to here, the training device, the training method, and the program according to the present disclosure have been described by way of the embodiment, but there is not particular limitation on the subject and device on which each processing is performed. Processing may be performed by a processor included in a locally disposed specific device or the like (described below). Also, processing may be performed by a cloud server or the like disposed in a location different from the local device.

The present disclosure is not limited to the embodiment given above. For example, other embodiments obtained by any combination of the structural elements described in the specification of the present application as well as embodiments implemented by excluding some of the structural elements may also be encompassed within the embodiment of the present disclosure. Also, variations obtained by making various modifications that can be conceived by a person having ordinary skill in the art to the above embodiment without departing from the gist of the present disclosure, or in other words, the meaning of the words recited in the appended claims are also encompassed within the scope of the present disclosure.

The present disclosure also encompasses the following embodiments.

(1) The above-described device is specifically a computer system that includes a microprocessor, a ROM, a RAM, a hard disk unit, a display unit, a keyboard, a mouse, and the like. A computer program is stored in the RAM or the hard disk unit. Each device achieves its function by the microprocessor operating in accordance with the computer program. Here, the computer program is a program configured by combining a plurality of instruction codes indicating instructions for the computer to implement predetermined functions.

(2) Some or all of the structural elements that constitute the device described above may be composed of a single system LSI (Large Scale Integration). The system LSI is a super multifunctional LSI manufactured by integrating a plurality of structural elements on a single chip, and is specifically a computer system that includes a microprocessor, a ROM, a RAM, and the like. A computer program is stored in the RAM. The system LSI implements its functions as a result of the microprocessor operating in accordance with the computer program.

(3) Some or all of the structural elements that constitute the device described above may be composed of an IC card or a single module that can be attached and detached to and from the device. The IC card or the module is a computer system that includes a microprocessor, a ROM, a RAM, and the like. The IC card or the module may include a super multifunctional LSI that was described above. The IC card or the module implements its functions as a result of the microprocessor operating in accordance with the computer program. The IC card or the module may be tamper resistant.

(4) Also, the present disclosure may be any of the methods described above, or a computer program that implements the methods by using a computer, or a digital signal from the computer program.

(5) Also, the present disclosure may be a computer-readable recording medium in which the computer program or the digital signal is recorded such as, for example, a flexible disk, a hard disk, a CD-ROM, a MO disk, a DVD, a DVD-ROM, a DVD-RAM, a BD (Blu-ray (registered trademark) Disc), or a semiconductor memory. Also, the present disclosure may be the digital signal recorded in the recording medium.

Also, the present disclosure may be a transmitter that transmits the computer program or the digital signal via a telecommunication line, a wireless or wired communication line, a network as typified by the Internet, data broadcasting, or the like.

Also, the present disclosure may be a computer system including a microprocessor and a memory, the memory storing the computer program described above, and the microprocessor operating in accordance with the computer program.

Also, the present disclosure may be carried out by an independent computer system by transferring the program or the digital signal that has been recorded in the recording medium, or by transferring the program or the digital signal via the network or the like.

While an embodiment has been described herein above, it is to be appreciated that various changes in form and detail may be made without departing from the spirit and scope of the present disclosure as presently or hereafter claimed.

Further Information About Technical Background to This Application

The disclosure of the following Japanese Patent Application including specification, drawings and claims are incorporated herein by reference in its entirety: Japanese Patent Application No. 2020-106847 filed on Jun. 22, 2020.

INDUSTRIAL APPLICABILITY

The present disclosure is applicable to a neural network training device, a training method, and a program, and more particularly to a neural network training device, a training method, and a program that can be installed in a vehicle or the like and used to infer the emotion of a target person from two or more modal information items regarding the target person.

The invention claimed is:

1. A training device, comprising:
a processor; and
a memory,
wherein, by using a program recorded in the memory,
the processor trains a deep neural network (DNN) model by (i) using training data that includes two or more modal information items and ground truth labels of the two or more modal information items and (ii) performing knowledge distillation that is a technique in which knowledge obtained as a result of a teacher model being trained is used to train a student model,
the DNN model includes: two or more DNNs; and a fusion that includes a configuration in which portions of the two or more DNNs are fused and that receives an input of features that are outputs of the two or more DNNs,
a first DNN, of the two or more DNNs, receives a first input of first modal information included in the two or more modal information items,
the first DNN includes a Conv2D layer, a Global Average Pooling layer, and a Fully Connected layer,
the Conv2D layer is a convolution layer that outputs two-dimensional feature maps obtained by performing convolution to extract features of the first modal information,
the Global Average Pooling layer averages outputs of the two-dimensional feature maps output from the Conv2D layer and outputs a two-dimensional result, and
the Fully Connected layer flattens the two-dimensional result output from the Global Average Pooling layer, by transforming the two-dimensional result into one-dimensional data, and outputs the one-dimensional data.

2. The training device according to claim 1,
wherein, in the training of the DNN model, the processor trains the DNN model by using the training data and also performing the knowledge distillation on an intermediate layer included in the DNN model, and
in the knowledge distillation, the processor performs the knowledge distillation by training outputs of intermediate layers included in the two or more DNNs by using an output of an intermediate layer included in the fusion as a distillation label when the two or more modal information items included in the training data are input to the DNN model.

3. The training device according to claim 2,
wherein in the knowledge distillation,
the processor performs the knowledge distillation by training outputs of a softmax function with temperature obtained as the outputs of the intermediate layers included in the two or more DNNs by using, as the distillation label, an output of the softmax function with temperature obtained as the output of the intermediate layer included in the fusion.

4. The training device according to claim 1,
wherein the teacher model and the student model are DNN models of a same architecture, and
in the training of the DNN model, the processor trains one of the DNN models as the teacher model by using the training data, and performs the knowledge distillation by training an other DNN model as the student model by using an output of the one of the DNN models that was trained as the teacher model when the two or more modal information items included in the training data were input, as a distillation label that serves as (i) a ground truth of an output of the DNN model to be trained as the student model when the two or more modal information items are input and (ii) a ground truth of outputs of intermediate layers included in the two or more DNNs in the DNN model to be trained as the student model.

5. The training device according to claim 1,
wherein, in the training of the DNN model, the processor trains each of first teacher models that are models having a same configuration as the two or more DNNs included in the DNN model by using corresponding modal information in the two or more modal information items included in the training data and a ground truth label of the corresponding modal information,
the processor trains, by using the training data, a teacher DNN model that includes a teacher fusion and the first teacher models that have been trained, the teacher fusion being a model that has a same configuration as the DNN model, includes a configuration in which portions of the first teacher models that have been trained are fused, and receives an input of features that are outputs of the first teacher models that have been trained,
the processor trains each of the two or more DNNs as the student model by using a distillation label that is output as a ground truth when the two or more modal information items are input to the teacher DNN model that has been trained and the corresponding first modal information, and
the processor performs the knowledge distillation by training the DNN model as the student model by using the distillation label and the two or more modal information items.

6. The training device according to claim 1,
wherein final layers included in the two or more DNNs are first fully connected layers that output the features that are outputs of the two or more DNNs, and
the fusion includes a layer in which the final layers included in the two or more DNNs are connected and to which the features that are outputs of the two or more DNNs are input.

7. The training device according to claim 1,
wherein an output of the DNN model is an inference result for the two or more modal information items, obtained as an output of the fusion.

8. The training device according to claim 7,
wherein the two or more modal information items includes sound information and video image information of a moving image in which a target person is shown, and
the DNN model outputs an emotion of the target person as the inference result.

9. A training method, comprising:
training a DNN model by (i) using training data that includes two or more modal information items and ground truth labels of the two or more modal information items and (ii) performing knowledge distillation that is a technique in which knowledge obtained as a result of a teacher model being trained is used to train a student model,
wherein the DNN model includes: two or more DNNs; and a fusion that includes a configuration in which portions of the two or more DNNs are fused and that receives an input of features that are outputs of the two or more DNNs,
a first DNN, of the two or more DNNs, receives a first input of first modal information included in the two or more modal information items,
the first DNN includes a Conv2D layer, a Global Average Pooling layer, and a Fully Connected layer,
the Conv2D layer is a convolution layer that outputs two-dimensional feature maps obtained by performing convolution to extract features of the first modal information,
the Global Average Pooling layer averages outputs of the two-dimensional feature maps output from the Conv2D layer and outputs a two-dimensional result, and
the Fully Connected layer flattens the two-dimensional result output from the Global Average Pooling layer, by transforming the two-dimensional result into one-dimensional data, and outputs the one-dimensional data.

10. The training device according to claim 1, wherein
the first DNN, of the two or more DNNs, receives the first input of the first modal information of a video image included in the two or more modal information items, and
a second DNN, of the two or more DNNs, receives a second input of second modal information of sound included in the two or more modal information items.

11. The training device according to claim 1, wherein
the first DNN further includes an output layer, and
the output layer performs classification by performing a conversion to probability using a softmax function based on the one-dimensional data output from the Fully Connected layer and maximizing the probability correctly classified into each of a plurality of emotion classification regions.

12. The training device according to claim 1, wherein
a second DNN, of the two or more DNNs, includes a feature extractor, a feature vector calculator, a second Conv2D layer, an ADD layer, a third Conv2D layer, and a Global Average Pooling layer,
the feature extractor extracts features of the second modal information,
the feature vector calculator calculates feature vectors of the features extracted by the feature extractor,
the second Conv2D layer is a second convolution layer that outputs first feature maps obtained by performing convolution to extract features of the feature vectors calculated by the feature vector calculator,
the ADD layer adds a plurality of inputs from the second Conv2D layer,
the third Conv2D layer is a third convolution layer that outputs second feature maps obtained by performing convolution to extract features of a total obtained by the ADD layer, and
the Global Average Pooling layer outputs an average of the outputs of the second feature maps output by the third Conv2D layer.

13. The training device according to claim 12, wherein
the second DNN further includes a second output layer, and
the second output layer performs classification by performing a conversion to probability using a softmax function based on the average output from the Global Average Pooling layer and maximizing the probability correctly classified into each of a plurality of emotion classification regions.

14. The training device according to claim 12, wherein
the fusion includes a layer in which final layers of the first DNN and the second DNN are connected and to which the one-dimensional data output from the Fully Connected layer and the average output by the Global Average Pooling layer are input.

15. The training device according to claim 14, wherein
the fusion performs inference processing from the one-dimensional data output from the Fully Connected layer of the first DNN and the average output by the Global Average Pooling layer of the second DNN as the portions of the two or more DNNs.

16. The training device according to claim 15, wherein
the fusion includes a second Fully Connected layer, and
the second Fully Connected layer fuses the one-dimensional data output from the Fully Connected layer of the first DNN and the average output by the Global Average Pooling layer of the second DNN as the portions of the two or more DNNs.

17. The training device according to claim 16, wherein
the fusion further includes an output layer, and
the output layer performs classification by performing a conversion to probability using a softmax function based on the portions of the two or more DNNs and maximizing the probability correctly classified into each of the plurality of emotion classification regions.

* * * * *